(12) United States Patent
Lello et al.

(10) Patent No.: US 12,439,919 B2
(45) Date of Patent: Oct. 14, 2025

(54) ACTIVE COMPOUND COMBINATIONS

(71) Applicant: Bayer CropScience LP, St. Louis, MO (US)

(72) Inventors: Raymond Lello, St. Louis, MO (US); Randy Myers, St. Louis, MO (US); Lawrence Norton, St. Louis, MO (US); Kelly Patzer, Calgary (CA); Jocelyn Kratchmer, Calgary (CA)

(73) Assignee: BAYER CROPSCIENCE LP, St. Louis, MO (US)

( * ) Notice: Subject to any disclaimer, the term of this patent is extended or adjusted under 35 U.S.C. 154(b) by 890 days.

(21) Appl. No.: 17/610,077

(22) PCT Filed: May 7, 2020

(86) PCT No.: PCT/US2020/031928
§ 371 (c)(1),
(2) Date: Nov. 9, 2021

(87) PCT Pub. No.: WO2020/231751
PCT Pub. Date: Nov. 19, 2020

(65) Prior Publication Data
US 2022/0240508 A1    Aug. 4, 2022

Related U.S. Application Data

(60) Provisional application No. 62/846,007, filed on May 10, 2019.

(51) Int. Cl.
*A01N 43/653* (2006.01)
*A01N 37/50* (2006.01)
*A01N 43/40* (2006.01)
*A01P 3/00* (2006.01)

(52) U.S. Cl.
CPC ........... *A01N 43/653* (2013.01); *A01N 37/50* (2013.01); *A01N 43/40* (2013.01); *A01P 3/00* (2021.08)

(58) Field of Classification Search
USPC ........................................................ 514/357
See application file for complete search history.

(56) References Cited

U.S. PATENT DOCUMENTS

| | | |
|---|---|---|
| 5,859,039 A | 1/1999 | Jautelat et al. |
| 6,306,850 B1 | 10/2001 | Dutzmann et al. |
| 6,436,976 B1 | 8/2002 | Erdelen et al. |
| 6,680,325 B2 | 1/2004 | Erdelen et al. |
| 6,750,177 B2 | 6/2004 | Hacker et al. |
| 7,232,840 B2 | 6/2007 | Erdelen et al. |
| 7,572,818 B2 | 8/2009 | Mansfield et al. |
| 7,670,990 B2 | 3/2010 | Gouot et al. |
| 7,696,237 B2 | 4/2010 | Erdelen et al. |
| 7,763,266 B2 | 7/2010 | Erdelen et al. |
| 7,776,892 B2 | 8/2010 | Grosjean-Cournoyer et al. |
| 7,786,148 B2 | 8/2010 | Gouot et al. |
| 8,168,660 B2 | 5/2012 | Grosjean-Cournoyer et al. |
| 8,410,020 B2 | 4/2013 | Gouot et al. |
| 8,617,581 B2 | 12/2013 | Erdelen et al. |
| 8,637,534 B2 | 1/2014 | Dutzmann et al. |
| 8,846,738 B2 | 9/2014 | Dutzmann et al. |
| 9,253,982 B2 | 2/2016 | Dutzmann et al. |
| 9,433,213 B2 | 9/2016 | Grosjean-Cournoyer et al. |
| 9,445,601 B2 | 9/2016 | Dutzmann et al. |
| 9,504,254 B2 | 11/2016 | Lu et al. |
| 9,591,856 B2 | 3/2017 | Krieg et al. |
| 9,788,540 B2 | 10/2017 | Fought et al. |
| 9,918,474 B2 | 3/2018 | Erdelen et al. |
| 2002/0173529 A1 | 11/2002 | Dutzmann et al. |
| 2006/0004070 A1 | 1/2006 | Wachendorff-Neumann et al. |
| 2013/0296389 A1 | 11/2013 | Dutzmann et al. |
| 2016/0106105 A1 | 4/2016 | Dutzmann et al. |
| 2019/0014781 A1 | 1/2019 | Grosjean-Cournoyer et al. |
| 2021/0022341 A1 | 1/2021 | Grosjean-Cournoyer et al. |

FOREIGN PATENT DOCUMENTS

| | | |
|---|---|---|
| CN | 102893995 A | 1/2013 |
| CN | 102960347 A | 3/2013 |
| CN | 103518770 A | 1/2014 |
| CN | 103719102 A | 4/2014 |
| CN | 104621125 A | 5/2015 |
| EP | 460575 A1 | 12/1991 |
| EP | 1571143 A1 | 9/2005 |

(Continued)

OTHER PUBLICATIONS

Groenewald et al., "Species Concepts in Cercospora: Spotting the Weeds Among the Roses", Studies in Mycology, vol. 75, Jun. 2013, pp. 115-170. (Year: 2013).*

(Continued)

*Primary Examiner* — Jeffrey H Murray
*Assistant Examiner* — Grace Ching Hsu
(74) *Attorney, Agent, or Firm* — Gale Wesley Starkey; Paul D. Tietz; Alexandria Quezada

(57) ABSTRACT

The present invention relates to active compound combinations comprising Fluopyram, at least one fungicide (B) selected from the group of inhibitors of the respiratory chain at complex I or II and at least one further fungicide (C) selected from the group of specified inhibitors of the respiratory chain at complex III, to compositions comprising such compound combination, and to the use thereof as biologically active agents, especially for control of harmful microorganisms in crop protection and in the protection of industrial materials.

6 Claims, No Drawings

(56) References Cited

FOREIGN PATENT DOCUMENTS

| | | |
|---|---|---|
| EP | 2612554 A1 | 7/2013 |
| WO | 1996016048 A1 | 5/1996 |
| WO | 97/00012 A1 | 1/1997 |
| WO | 98/25459 A1 | 6/1998 |
| WO | 1998047367 A1 | 10/1998 |
| WO | 99/63813 A2 | 12/1999 |
| WO | 1999063826 A1 | 12/1999 |
| WO | 00/72677 A1 | 12/2000 |
| WO | 03073850 A1 | 9/2003 |
| WO | 03073851 A1 | 9/2003 |
| WO | 03073852 A2 | 9/2003 |
| WO | 03073853 A2 | 9/2003 |
| WO | 03/090538 A1 | 11/2003 |
| WO | 2004000021 A1 | 12/2003 |
| WO | 200416088 A2 | 2/2004 |
| WO | 2005077180 A1 | 8/2005 |
| WO | 2005077181 A1 | 8/2005 |
| WO | 2005077182 A1 | 8/2005 |
| WO | 2005077183 A1 | 8/2005 |
| WO | 2005077901 A1 | 8/2005 |
| WO | 2012013590 A2 | 2/2012 |
| WO | WO-2013104609 A1 * | 7/2013 ............. A01N 43/40 |
| WO | WO 2018/201882 A1 * | 11/2018 |

OTHER PUBLICATIONS

International Search Report for Application No. PCT/US2020/031928 mailed Sep. 23, 2020.

* cited by examiner

ACTIVE COMPOUND COMBINATIONS

CROSS-REFERENCE TO RELATED APPLICATIONS

This application is the National Stage entry of International Application No. PCT/US2020/031928, filed 7 May 2020, which claims priority to U.S. Application No. 62/846,007, filed 10 May 2019.

BACKGROUND

Field

The present invention relates to active compound combinations comprising as compound (A) Fluopyram, as compound (B) Prothioconazole and as compound (C) at least one fungicide selected from the group consisting of Trifloxystrobin and Tebuconazole. Moreover, the invention relates to fungicide compositions comprising such active compound combination and to the use of the active compound combinations and the fungicide compositions as biologically active agent, especially for control of phytopathogenic fungi in crop protection.

Throughout this application the terms "composition" and "formulation" are used synonymously and refer to mixtures of a compound combination of the invention and at least one agriculturally suitable auxiliary.

Description of Related Art

Fluopyram, its preparation and its fungicidal efficacy is known from WO 2004/16088, WO 2005/077901, WO 2005/077183, WO 2005/077182, WO 2005/077181, WO 2005/077180, discloses active compound combinations comprising certain pyridyl ethyl benzamide derivatives, including Fluopyram, and at least one further fungicide.

Albeit Fluopyram and the known compound combinations comprising this compound provide excellent means in protecting plants from diseases caused by fungi, there is still need to even improve those means in order to address the ever increasing environmental and economic requirements imposed on modern-day crop protection agents and compositions. This includes, for example, improvement to the spectrum of action, safety profile, selectivity, application rate, formation of residues, and favourable preparation ability, and development of new compositions to deal with potential problems, like resistances, mycotoxins.

SUMMARY

The present invention provides active compound combinations and compositions comprising said combinations which at least in some aspects achieve the stated objective.

Accordingly, the present invention provides active compound combinations comprising
  (A) Fluopyram,
  (B) Prothioconazole
and
  (C) at least one fungicide selected from the group consisting of Trifloxystrobin and Tebuconazole.

DETAILED DESCRIPTION OF A PREFERRED EMBODIMENT

The active compound combinations according to the invention comprise as compound (A) Fluopyram or a salt or N-oxide thereof. The salts or N-oxides of Fluopyram also have fungicidal properties. Fluopyram is depicted by formula (I)

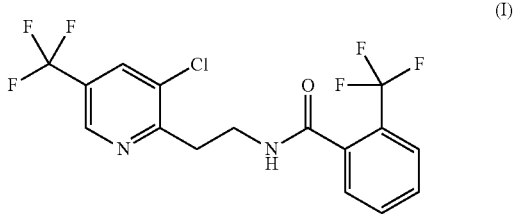 [SMILES: O=C(NCCc1ncc(C(F)(F)F)cc1Cl)c1ccccc1C(F)(F)F]

(I)

and is denoted in the following also compound (I) or simply (I). Fluopyram has the chemical name N-[2-[3-chloro-5-(trifluoromethyl)-2-pyridinyl]ethyl]-2-(trifluoromethyl)benzamide (CAS No. 658066-35-4).

The active compound combinations according to the invention further comprise as compound (B) at least one fungicidally active compound selected from inhibitors of the respiratory chain at complex I or II. The at least one further active compound (B) is different from compounds (A) and (C).

Compound (B) is Prothioconazole depicted by formula (II)

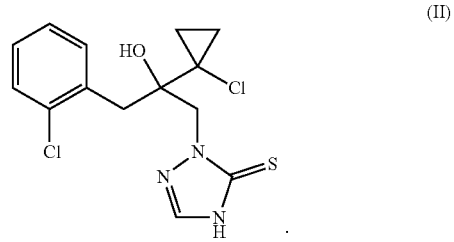 [SMILES: OC(Cc1ccccc1Cl)(Cn1nc[nH]c1=S)C1(Cl)CC1]

(II)

Prothioconazole has the chemical name 2-[2-(1-chlorocyclopropyl)-3-(2-chlorophenyl)-2-hydroxypropyl]-1,2-dihydro-3H-1,2,4-triazole-3-thione (CAS No. 178928-70-6). Prothioconazole, its preparation and its fungicidal efficacy is known from WO 1996016048, WO 1998047367, WO 1999063826, WO 03/090538, WO 03/073850, WO 03/073851, WO 03/073852, WO 03/073853, WO 04/000021, discloses active compound combinations comprising Prothioconazole, and at least one further fungicide.

The active compound combinations according to the invention further comprise as compound (C) at least one fungicidally active compound selected from the group consisting of Trifloxystrobin and Tebuconazole.

In one embodiment compound (C) is Trifloxystrobin depicted by formula (IIIa)

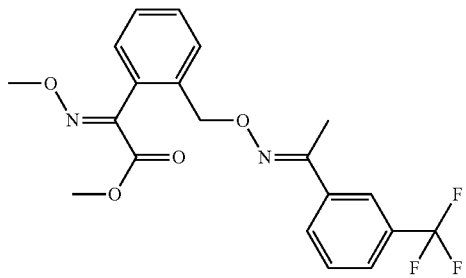
(IIIa)

Trifloxystrobin has the chemical name methylalpha-(methoxyimino)-2-[[[[1-[3-(trifluoromethyl)phenyl]ethyl-idene]amino]oxy]methyl]-benzeneacetate 141517-21-7. Trifloxystrobin, its preparation and its fungicidal efficacy is known from EP 460575, WO 97/00012, WO 98/25459, WO 99/63813, WO 00/72677, discloses active compound combinations comprising certain strobilurine fungicides, including trifloxystrobin, and at least one further fungicide.

In one embodiment compound (C) is Tebuconazole depicted by formula (IIIb)
(IIIb)

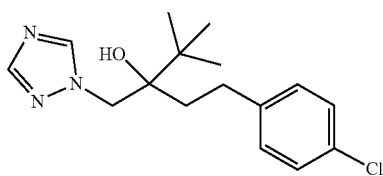 [SMILES: CC(C)(C)C(O)(CCc1ccc(Cl)cc1)Cn1cncn1]

Tebuconazole has the chemical name (+−)-.alpha.-[2-(4-chlorophenyl)ethyl]-.alpha.-(1,1-dimethylethyl)-1H-1,2,4-triazole-1-ethanol (CAS No. 107534-96-3).

One preferred compound combination is (A) Fluopyram+(B) Prothioconazole+(C) Trifloxystrobin.

One preferred compound combination is (A) Fluopyram+(B) Prothioconazole+(C) Tebuconazole.

In the combinations according to the invention the compounds (A) and (B) can be present in a range of effective weight ratio of A:B, for example in a range of 10:1 to 1:10, preferably in a weight ratio of 2:1 to 1:2, most preferably in a weight ratio of 1.4:1 to 1:1.4 or 1:1 to 1:1. Further ratios of A:B which can be used according to the present invention with increasing preference in the order given are: 10:1 to 1:10, 9:1 to 1:9, 8:1 to 1:8, 7.5:1 to 1:7.5, 7:1 to 1:7, 6.5:1 to 1:6.5, 6:1 to 1:6, 5.5:1 to 1:5.5, 4.5:1 to 1:4.5, 4:1 to 1:4, 3.5:1 to 1:3.5, 3:1 to 1:3, 2.5:1 to 1:2.5, 2:1 to 1:2, 1.5:1 to 1:1.5, 1:1 to 1:1, 1:1 to 1:10, 1:1 to 1:9, 1:1 to 1:8, 1:1 to 1:7.5, 1:1 to 1:7, 1:1 to 1:6.5, 1:1 to 1:6, 1:1 to 1:5.5, 1:1 to 1:4.5, 1:1 to 1:4, 1:1 to 1:3.5, 1:1 to 1:3, 1:1 to 1:2.5, 1:1 to 1:2, 1:1 to 1:1.5, 1:1 to 1:1.

In the combinations according to the invention the compounds (A) and (C) can be present in a broad range of effective weight ratio of (A):(C), for example in a range of 10:1 to 1:10, preferably in a weight ratio of 2:1 to 1:2, most preferably in a weight ratio of 1.2:1 to 1:1.2 or 1:1 to 1:1. Further ratios of A:B which can be used according to the present invention with increasing preference in the order given are: 10:1 to 1:10, 9:1 to 1:9, 8:1 to 1:8, 7.5:1 to 1:7.5, 7:1 to 1:7, 6.5:1 to 1:6.5, 6:1 to 1:6, 5.5:1 to 1:5.5, 4.5:1 to 1:4.5, 4:1 to 1:4, 3.5:1 to 1:3.5, 3:1 to 1:3, 2.5:1 to 1:2.5, 1.5:1 to 1:1.5, 1:1 to 1:1, 1:1 to 1:10, 1:1 to 1:9, 1:1 to 1:8, 1:1 to 1:7.5, 1:1 to 1:7, 1:1 to 1:6.5, 1:1 to 1:6, 1:1 to 1:5.5, 1:1 to 1:4.5, 1:1 to 1:4, 1:1 to 1:3.5, 1:1 to 1:3, 1:1 to 1:2.5, 1:1 to 1:1.5, 1:1 to 1:1.

In the combinations according to the invention also the compounds (B) and (C) can be present in a broad range of effective weight ratio of (B):(C). The respective weight ratio automatically derives from the chosen weight ratios (A):(B) and (A):(C). A preferred ratio of (A):(B):(C) is 1:1.4:1.2 (or 5:7:6). Another preferred ratio of of (A):(B):(C) is 2:2:5. Another preferred ratio of of (A):(B):(C) is 16:7:6. Another preferred ratio of of (A):(B):(C) is from 5:1:1 to 1:5:5. Another preferred ratio of of (A):(B):(C) is from 5:5:1 to 1:1:5. Another preferred ratio of of (A):(B):(C) is from 5:3:1 to 1:3:5. Another preferred ratio of of (A):(B):(C) is from 3:3:1 to 1:1:3. Another preferred ratio of of (A):(B):(C) is from 3:2:1 to 1:2:3.

Definitions

In the context of the present invention, "control of phytopathogenic fungi" means a significant reduction in infestation by phytopathogenic fungi, compared with the untreated plant, preferably a significant reduction (by 25-50%), compared with the untreated plant (100%), more preferably a significant reduction (by 40-79%), compared with the untreated plant (100%); even more preferably, the infection by phytopathogenic fungi is entirely suppressed (by 70-100%). The control may be curative, i.e., for treatment of already infected plants, or protective, for protection of plants which have not yet been infected.

In one embodiment "control of Cercospora related plant disease" means a significant reduction in infestation by Cercospora species, compared with the untreated plant, preferably a significant reduction (by 25-50%), compared with the untreated plant (100%), more preferably a significant reduction (by 40-79%), compared with the untreated plant (100%); even more preferably, the infection by Cercospora species is entirely suppressed (by 70-100%). The control may be curative, i.e., for treatment of already infected plants, or protective, for protection of plants which have not yet been infected. In preferred embodiment Cercospora related plant disease is controlled in soy, corn, cereals, vegetables, legumes.

In one embodiment "control of Gray Leaf Spot disease" means a significant reduction in infestation by Cercospora zeae-maydis and/or Cercospora zeina, compared with the untreated plant, preferably a significant reduction (by 25-50%), compared with the untreated plant (100%), more preferably a significant reduction (by 40-79%), compared with the untreated plant (100%); even more preferably, the infection by Cercospora zeae-maydis and/or Cercospora zeina is entirely suppressed (by 70-100%). The control may be curative, i.e., for treatment of already infected plants, or protective, for protection of plants which have not yet been infected. In preferred embodiment Gray Leaf Spot disease is controlled in corn.

In one embodiment "control of Frog Eye Spot disease" means a significant reduction in infestation by Cercospora sojina, compared with the untreated plant, preferably a significant reduction (by 25-50%), compared with the untreated plant (100%), more preferably a significant reduction (by 40-79%), compared with the untreated plant (100%); even more preferably, the infection by Cercospora sojina is entirely suppressed (by 70-100%). The control may be curative, i.e., for treatment of already infected plants, or protective, for protection of plants which have not yet been infected. In preferred embodiment Frog Eye Spot disease disease is controlled in soy.

In one embodiment "increase of yield" means a significant increase in harvested grain, compared with the untreated plant, preferably a significant increase (by 1 to 3%), compared with the untreated plant, more preferably a significant increase (by 4 to 6%), compared with the untreated plant; even more preferably, an increase (by 7-10%).

In the context of the present invention, a plant is preferably understood to mean a plant at dormancy stage (BBCH 00 according to the BBCH monograph from the German Federal Biological Research Centre for Agriculture and Forestry, 2nd edition, 2001) or after up to the stage of end of leaf fall (BBCH 97).

All plants and plant parts as well as the soil in which the plant or the plant parts will grow, grows or has been grown, can be treated in accordance with the invention.

In the context of the present invention, plants are understood here to mean all plants and plant populations, such as desired and undesired wild plants or crop plants (including naturally occurring crop plants). Crop plants may be plants which can be obtained by conventional breeding and optimization methods or by biotechnological and genetic engineering methods or combinations of these methods, including the transgenic plants and including the plant varieties which are protectable and non-protectable by plant breeders' rights.

In the context of the present invention, the term "plant parts" are to be understood as meaning all above-ground and below-ground parts and organs of plants, such as shoot, leaf, flower and root, by way of example ears, leaves, needles, stalks, stems, trunks, flowers, fruit bodies, fruits, seed (including seeds of transgenic plants), seedlings, root-stocks, grafts and cuttings, and also roots, and rhizomes. The plant parts also include harvested material and also vegetative and generative propagation material, for example root-stocks, cuttings, grafts, rhizomes, slips and seedlings.

Preferred plant parts are leaves, stems, stalks, flowers, silks, seeds, and fruits, very preferred are stems, shoots and leaves.

Isomers

As already outlined above Fluopyram, Prothioconazole, Trifloxystrobin or Tebunazole may be present in the form of different stereoisomers. These stereoisomers are, for example, enantiomers, diastereomers, atropisomers or geometric isomers. Accordingly, the invention encompasses both pure stereoisomers and any mixture of these isomers. Where a compound can be present in two or more tautomer forms in equilibrium, reference to the compound by means of one tautomeric description is to be considered to include all tautomer forms. Where a compound can be present in isomeric forms and/or tautomeric forms, such a compound is understood hereinabove and hereinbelow also to include, where applicable, corresponding isomeric and/or tautomeric forms or mixtures thereof, even when these are not specifically mentioned in each case.

Salts/N-Oxides

Depending on the nature of the substituents, the compounds present in the compound combinations of the invention may be present in the form of the free compound and/or a solvate and/or an agrochemically active salt and/or an N-oxide thereof. Fluopyram may be present in the form of its N-oxide.

Agrochemically active salts include acid addition salts of inorganic and organic acids well as salts of customary bases. Examples of inorganic acids are hydrohalic acids, such as hydrogen fluoride, hydrogen chloride, hydrogen bromide and hydrogen iodide, sulfuric acid, phosphoric acid and nitric acid, and acidic salts, such as sodium bisulfate and potassium bisulfate. Useful organic acids include, for example, formic acid, carbonic acid and alkanoic acids such as acetic acid, trifluoroacetic acid, trichloroacetic acid and propionic acid, and also glycolic acid, thiocyanic acid, lactic acid, succinic acid, citric acid, benzoic acid, cinnamic acid, oxalic acid, saturated or mono- or diunsaturated fatty acids having 6 to 20 carbon atoms, alkylsulphuric monoesters, alkylsulphonic acids (sulphonic acids having straight-chain or branched alkyl radicals having 1 to 20 carbon atoms), arylsulphonic acids or aryldisulphonic acids (aromatic radicals, such as phenyl and naphthyl, which bear one or two sulphonic acid groups), alkylphosphonic acids (phosphonic acids having straight-chain or branched alkyl radicals having 1 to 20 carbon atoms), arylphosphonic acids or aryldiphosphonic acids (aromatic radicals, such as phenyl and naphthyl, which bear one or two phosphonic acid radicals), where the alkyl and aryl radicals may bear further substituents, for example p-toluenesulphonic acid, salicylic acid, p-aminosalicylic acid, 2-phenoxybenzoic acid, 2-acetoxybenzoic acid.

Solvates of the compounds present in the compound combinations of the invention or their salts are stoichiometric compositions of the compounds with solvents.

N-oxides of compounds present in the compound combination of the invention or intermediates thereof can be obtained in a simple manner by customary processes, for example by N-oxidation with hydrogen peroxide ($H_2O_2$), peracids, for example peroxy sulfuric acid or peroxy carboxylic acids, such as meta-chloroperoxybenzoic acid or peroxymonosulfuric acid (Caro's acid).

E.g., the corresponding N-oxides may be prepared starting from the respective compounds using conventional oxidation methods, e.g., by treating the compounds with an organic peracid such as metachloroperbenzoic acid (e.g., WO 2003/64572 or J. Med. Chem. 38 (11), 1892-1903, 1995); or with inorganic oxidizing agents such as hydrogen peroxide (e.g., J. Heterocyc. Chem. 18 (7), 1305-1308, 1981) or oxone (e.g., J. Am. Chem. Soc. 123 (25), 5962-5973, 2001). The oxidation may lead to pure mono-N-oxides or to a mixture of different N-oxides, which can be separated by conventional methods such as chromatography.

Crystalline Form

The compounds present in the compound combinations of the invention may exist in multiple crystalline and/or amorphous forms. Crystalline forms include unsolvated crystalline forms, solvates and hydrates.

Formulations

The present invention further relates to compositions for controlling phytopathogenic fungi, comprising an active compound combination comprising as compound (A) Fluopyram, as compound (B) Prothioconazole and as compound (C) at least one fungicide selected from the group consisting of Trifloxystrobin and Tebuconazole. The compositions may be applied to the phytopathogenic fungi and/or in their habitat.

The composition comprises an active compound combination comprising as compound (A) Fluopyram, as compound (B) Prothioconazole and as compound (C) at least one fungicide selected from the group consisting of Trifloxystrobin and Tebuconazole and at least one agriculturally suitable auxiliary, e.g., carrier(s) and/or surfactant(s).

The present invention further relates to formulations and use forms prepared therefrom for controlling phytopathogenic fungi, for example spray liquors, comprising an active compound combination comprising as compound (A) Fluopyram, as compound (B) Prothioconazole and as compound (C) at least one fungicide selected from the group consisting of Trifloxystrobin and Tebuconazole. In some cases, the use forms comprise further active ingredients, biological control agents, fertilizer and/or adjuvants which improve action, such as penetrants, e.g., vegetable oils, for example rapeseed oil, sunflower oil, mineral oils, for example paraffin oils, alkyl esters of vegetable fatty acids, for example rapeseed oil methyl ester or soya oil methyl ester, or alkanol alkoxylates and/or spreaders, for example alkylsiloxanes and/or salts, for example organic or inorganic ammonium or phosphonium salts, for example ammonium sulphate or diammonium hydrogenphosphate and/or retention promoters, for example dioctyl sulphosuccinate or hydroxypropyl guar polymers and/or humectants, for example glycerol and/or fertilizers, for example ammonium-, potassium- or phosphorus-containing fertilizers.

Customary formulations are, for example, water-soluble liquids (SL), emulsion concentrates (EC), emulsions in water (EW), suspension concentrates (SC, SE, FS, OD), water-dispersible granules (WG), granules (GR) and capsule concentrates (CS); these and further possible formulation types are described, for example, by Crop Life International and in Pesticide Specifications, Manual on Development and Use of FAO and WHO Specifications for Pesticides, FAO Plant Production and Protection Papers—173, prepared by the FAO/WHO Joint Meeting on Pesticide Specifications, 2004, ISBN: 9251048576. The formulations, in addition to the active compound combination according to the invention, optionally comprise further agrochemically active compounds.

These are preferably formulations or use forms which comprise auxiliaries, for example extenders, solvents, spontaneity promoters, carriers, emulsifiers, dispersants, frost protectants, biocides, thickeners and/or further auxiliaries, for example adjuvants. An adjuvant in this context is a component which enhances the biological effect of the formulation, without the component itself having any biological effect. Examples of adjuvants are agents which promote retention, spreading, attachment to the leaf surface or penetration.

These formulations are prepared in a known way, for example by mixing the active compound combination comprising as compound (A) Fluopyram, as compound (B) Prothioconazole and as compound (C) at least one fungicide selected from the group consisting of Trifloxystrobin and Tebuconazole with auxiliaries such as, for example, extenders, solvents and/or solid carriers and/or other auxiliaries such as, for example, surfactants. The formulations are prepared either in suitable facilities or else before or during application.

The auxiliaries used may be substances suitable for imparting special properties, such as certain physical, technical and/or biological properties, to the formulation of the active compound combination according to the invention, or to the use forms prepared from these formulations (for example ready-to-use pesticides such as spray liquors or seed dressing products).

Suitable extenders are, for example, water, polar and nonpolar organic chemical liquids, for example from the classes of the aromatic and non-aromatic hydrocarbons (such as paraffins, alkylbenzenes, alkylnaphthalenes, chlorobenzenes), the alcohols and polyols (which, if appropriate, may also be substituted, etherified and/or esterified), the ketones (such as acetone, cyclohexanone), the esters (including fats and oils) and (poly)ethers, the unsubstituted and substituted amines, amides, lactams (such as N-alkylpyrrolidones) and lactones, the sulphones and sulphoxides (such as dimethyl sulphoxide), the carbonates and the nitriles.

If the extender used is water, it is also possible to employ, for example, organic solvents as auxiliary solvents. Essentially, suitable liquid solvents are: aromatics such as xylene, toluene or alkylnaphthalenes, chlorinated aromatics or chlorinated aliphatic hydrocarbons such as chlorobenzenes, chloroethylenes or methylene chloride, aliphatic hydrocarbons such as cyclohexane or paraffins, for example mineral oil fractions, mineral and vegetable oils, alcohols such as butanol or glycol and their ethers and esters, ketones such as acetone, methyl ethyl ketone, methyl isobutyl ketone or cyclohexanone, strongly polar solvents such as dimethylformamide or dimethyl sulphoxide, carbonates such as propylene carbonate, butylene carbonate, diethyl carbonate or dibutyl carbonate, or nitriles such as acetonitrile or propanenitrile or liquid terpenes.

In principle, it is possible to use all suitable solvents. Examples of suitable solvents are aromatic hydrocarbons, such as xylene, toluene or alkylnaphthalenes, chlorinated aromatic or chlorinated aliphatic hydrocarbons, such as chlorobenzene, chloroethylene or methylene chloride, aliphatic hydrocarbons, such as cyclohexane, paraffins, petroleum fractions, mineral and vegetable oils, alcohols, such as methanol, ethanol, isopropanol, butanol or glycol and their ethers and esters, ketones such as acetone, methyl ethyl ketone, methyl isobutyl ketone or cyclohexanone, strongly polar solvents, such as dimethyl sulphoxide, carbonates such as propylene carbonate, butylene carbonate, diethyl carbonate or dibutyl carbonate, nitriles such as acetonitrile or propanenitrile, and also water.

In principle, it is possible to use all suitable carriers. Useful carriers include especially: for example ammonium salts and ground natural minerals such as kaolins, clays, talc, chalk, quartz, attapulgite, montmorillonite or diatomaceous earth, and ground synthetic materials such as finely divided silica, alumina and natural or synthetic silicates, resins, waxes and/or solid fertilizers. Mixtures of such carriers can likewise be used. Useful carriers for granules include: for example crushed and fractionated natural rocks such as calcite, marble, pumice, sepiolite, dolomite, and synthetic granules of inorganic and organic meals, and also granules of organic material such as sawdust, paper, coconut shells, corn cobs and tobacco stalks.

Liquefied gaseous extenders or solvents can also be used. Particularly suitable extenders or carriers are those which are gaseous at ambient temperature and under atmospheric pressure, for example aerosol propellant gases, such as halohydrocarbons, and also butane, propane, nitrogen and carbon dioxide.

Examples of emulsifiers and/or foam-formers, dispersants or wetting agents with ionic or nonionic properties, or mixtures of these surfactants, are salts of polyacrylic acid, salts of lignosulphonic acid, salts of phenolsulphonic acid or naphthalenesulphonic acid, polycondensates of ethylene oxide with fatty alcohols or with fatty acids or with fatty amines, with substituted phenols (preferably alkylphenols or arylphenols), salts of sulphosuccinic esters, taurine derivatives (preferably alkyl taurates), isethionate derivatives, phosphoric esters of polyethoxylated alcohols or phenols, fatty esters of polyols, and derivatives of the compounds containing sulphates, sulphonates and phosphates, for example alkylaryl polyglycol ethers, alkylsulphonates, alkyl sulphates, arylsulphonates, protein hydrolysates, lignosulphite waste liquors and methylcellulose. The presence of a surfactant is advantageous if at least one of the compounds of the active compound combination according to the invention and/or one of the inert carriers is insoluble in water and when the application takes place in water.

It is possible to use colorants such as inorganic pigments, for example iron oxide, titanium oxide and Prussian Blue, and organic dyes such as alizarin dyes, azo dyes and metal phthalocyanine dyes, and nutrients and trace nutrients such as salts of iron, manganese, boron, copper, cobalt, molybdenum and zinc as further auxiliaries in the formulations and the use forms derived therefrom.

Additional components may be stabilizers, such as low-temperature stabilizers, preservatives, antioxidants, light stabilizers or other agents which improve chemical and/or physical stability. Foam formers or antifoams may also be present.

Tackifiers such as carboxymethylcellulose and natural and synthetic polymers in the form of powders, granules or latices, such as gum arabic, polyvinyl alcohol and polyvinyl acetate, or else natural phospholipids such as cephalins and lecithins and synthetic phospholipids may also be present as additional auxiliaries in the formulations and the use forms derived therefrom. Further possible auxiliaries are mineral and vegetable oils.

Optionally, further auxiliaries may be present in the formulations and the use forms derived therefrom. Examples of such additives include fragrances, protective colloids, binders, adhesives, thickeners, thixotropic agents, penetrants, retention promoters, stabilizers, sequestrants, complexing agents, humectants, spreaders. In general, the active compound combination according to the invention can be combined with any solid or liquid additive commonly used for formulation purposes.

Useful retention promoters include all those substances which reduce the dynamic surface tension, for example dioctyl sulphosuccinate, or increase the viscoelasticity, for example hydroxypropylguar polymers.

Suitable penetrants in the present context are all those substances which are usually used for improving the penetration of agrochemical active compounds into plants. Penetrants are defined in this context by their ability to penetrate from the (generally aqueous) application liquor and/or from the spray coating into the cuticle of the plant and thereby increase the mobility of active compounds in the cuticle. The method described in the literature (Baur et al., 1997, Pesticide Science 51, 131-152) can be used to determine this property. Examples include alcohol alkoxylates such as coconut fatty ethoxylate (10) or isotridecyl ethoxylate (12), fatty acid esters, for example rapeseed oil methyl ester or soya oil methyl ester, fatty amine alkoxylates, for example tallowamine ethoxylate (15), or ammonium and/or phosphonium salts, for example ammonium sulphate or diammonium hydrogenphosphate. The composition may be in any customary form, such as solutions (e.g., aqueous solutions), emulsions, wettable powders, water- and oil-based suspensions, powders, dusts, pastes, soluble powders, soluble granules, granules for broadcasting, suspoemulsion concentrates, natural or synthetic products impregnated with the compound combination of the invention, fertilizers and also microencapsulations in polymeric substances. The compound combination of the invention may be present in a suspended, emulsified or dissolved form.

The formulations mentioned can be prepared in a manner known per se, for example by mixing the active ingredients with at least one auxiliary.

The composition may be provided to the end user as ready-for-use formulation, i.e., the compositions may be directly applied to the plants or seeds by a suitable device, such as a spraying or dusting device. Alternatively, the compositions may be provided to the end user in the form of concentrates which have to be diluted, preferably with water, prior to use.

The formulations contain generally between 20 and 80% by weight, from 25 and 75% by weight, preferably between 30 and 60% by weight, more preferably between 30 and 50%, most preferably from 40 to 50% by weight of the compound combination of the present invention. If the composition comprises two or more active ingredients, the outlined ranges refer to the total amount of the compound combination of the present invention.

The formulations described above can be used for controlling phytopathogenic fungi by applying it to the phytopathogenic fungi and/or in their habitat.

In one particular embodiment the active compound combination comprising as compound (A) Fluopyram, as compound (B) Prothioconazole and as compound (C) at least one fungicide selected from the group consisting of Trifloxystrobin and Tebuconazole is provided in sprayable form to allow spray application. In this embodiment, the active compound combination comprising as compound (A) Fluopyram, as compound (B) Prothioconazole and as compound (C) at least one fungicide selected from the group consisting of Trifloxystrobin and Tebuconazole is provided as composition/formulation, comprising the active ingredients and at least one suitable liquid carrier.

Suitable liquid carriers are preferably selected from water, organic solvents and combinations thereof. More preferred, the liquid carrier is water or a mixture of water and an organic solvent.

Preferred suitable organic solvents are those already described above.

The amount of liquid carrier typically ranges from 1 to 99.99%, preferably from 5 to 99.9%, more preferably from 10 to 99.5%, and most preferably from 20 to 99% by weight of the composition.

Preferably, the sprayable composition further comprises at least one surfactant. Suitable surfactants are disclosed above. It may also comprise at least one further auxiliary as outlined above.

Preferably, the sprayable composition is provided as a suspension concentrate comprising the active ingredients in a total amount of 20 to 500 g/L, preferably 200 to 400 g/L or 200 to 500 g/L.

Preparation of said concentrates is well known to those skilled in the art. Suspension concentrates (SC) can be prepared by mixing the desired amount of active ingredients, e.g., 50 to 500 g per litre concentrate, 20 to 100 g per litre concentrate of at least one surfactant and 1 to 20 g per litre concentrate of at least one binder and/or secondary thickener and suspending this mixture in water.

Preferably, before applying said concentrates to the plant or a part thereof, the concentrate is diluted with water. More preferably, the emulsifiable concentrate or suspension concentrate is mixed with water in such amount to arrive at a total concentration of active ingredients in the resulting mixture of 0.1 to 5, preferably 0.2 to 2, more preferred 0.25 to 1 g/L.

Further Active Ingredients

The active compound combinations comprising as compound (A) Fluopyram, as compound (B) Prothioconazole and as compound (C) at least one fungicide selected from the group consisting of Trifloxystrobin and Tebuconazole can be used as such or in compositions/formulations thereof and can be mixed with further known active ingredients, for example bactericides, acaricides, nematicides or insecticides, in order thus to broaden, for example, the activity spectrum or to prevent development of resistance.

Useful mixing partners include, for example, insecticides, acaricides, nematicides and bactericides (see also Pesticide Manual, 14th ed.)

A mixture with other known active ingredients, such as herbicides, or with fertilizers and growth regulators, safeners and/or semiochemicals, is also possible.

Examples of biological control agents which may be combined with the compound combinations of the invention are:

(A) Antibacterial agents selected from the group of:
(A1) bacteria, such as (A1.1) *Bacillus subtilis*, in particular strain QST713/AQ713 (available as SERENADE® OPTI or SERENADE® ASO from Bayer CropScience LP, US, having NRRL Accession No. B-21661 and described in U.S. Pat. No. 6,060,051); (A1.2) *Bacillus amyloliquefaciens*, in particular strain D747 (available as DOUBLE NICKEL™ from Certis, US, having accession number FERM BP-8234 and disclosed in U.S. Pat. No. 7,094,592); (A1.3) *Bacillus pumilus*, in particular strain BU F-33 (having NRRL Accession No. 50185); (A1.4) *Bacillus subtilis* var. *amyloliquefaciens* strain FZB24 (available as TAEGRO® from Novozymes, US); (A1.5) a *Paenibacillus* sp. strain having Accession No. NRRL B-50972 or Accession No. NRRL B-67129 and described in International Patent Publication No. WO 2016/154297; and
(A2) fungi, such as (A2.1) *Aureobasidium pullulans*, in particular blastospores of strain DSM14940; (A2.2) *Aureobasidium pullulans* blastospores of strain DSM 14941; (A2.3) *Aureobasidium pullulans*, in particular mixtures of blastospores of strains DSM14940 and DSM14941;

(B) Biological fungicides selected from the group of:
(B1) bacteria, for example (B1.1) *Bacillus subtilis*, in particular strain QST713/AQ713 (available as SERENADE® OPTI or SERENADE® ASO from Bayer CropScience LP, US, having NRRL Accession No. B-21661 and described in U.S. Pat. No. 6,060,051); (B1.2) *Bacillus pumilus*, in particular strain QST2808 (available as SONATA® from Bayer CropScience LP, US, having Accession No. NRRL B-30087 and described in U.S. Pat. No. 6,245,551); (B1.3) *Bacillus pumilus*, in particular strain GB34 (available as YIELD SHIELD® from Bayer AG, DE); (B1.4) *Bacillus pumilus*, in particular strain BU F-33 (having NRRL Accession No. 50185); (B1.5) *Bacillus amyloliquefaciens*, in particular strain D747 (available as DOUBLE NICKEL™ from Certis, US, having accession number FERM BP-8234 and disclosed in U.S. Pat. No. 7,094, 592); (B1.6) *Bacillus subtilis* Y1336 (available as BIOBAC® WP from Bion-Tech, Taiwan, registered as a biological fungicide in Taiwan under Registration Nos. 4764, 5454, 5096 and 5277); (B1.7) *Bacillus amyloliquefaciens* strain MBI 600 (available as SUBTILEX® from BASF SE); (B1.8) *Bacillus subtilis* strain GB03 (available as KODIAK® from Bayer AG, DE); (B1.9) *Bacillus subtilis* var. *amyloliquefaciens* strain FZB24 (available from Novozymes Biologicals Inc., Salem, Virginia or Syngenta Crop Protection, LLC, Greensboro, North Carolina as the fungicide TAEGRO® or TAEGRO® ECO (EPA Registration No. 70127-5); (B1.10) *Bacillus mycoides*, isolate J (available as BmJ TGAI or WG from Certis USA); (B1.11) *Bacillus licheniformis*, in particular strain SB3086 (available as ECOGUARD™ BIOFUNGICIDE and GREEN RELEAF from Novozymes); (B1.12) a *Paenibacillus* sp. strain having Accession No. NRRL B-50972 or Accession No. NRRL B-67129 and described in International Patent Publication No. WO 2016/154297.

In some embodiments, the biological control agent is a *Bacillus subtilis* or *Bacillus amyloliquefaciens* strain that produces a fengycin or plipastatin-type compound, an iturin-type compound, and/or a surfactin-type compound. For background, see the following review article: Ongena, M., et al., "*Bacillus* Lipopeptides: Versatile Weapons for Plant Disease Biocontrol," Trends in Microbiology, Vol 16, No. 3, March 2008, pp. 115-125. *Bacillus* strains capable of producing lipopeptides include *Bacillus subtilis* QST713 (available as SERENADE® OPTI or SERENADE® ASO from Bayer CropScience LP, US, having NRRL Accession No. B-21661 and described in U.S. Pat. No. 6,060,051), *Bacillus amyloliquefaciens* strain D747 (available as Double Nickel™ from Certis, US, having accession number FERM BP-8234 and disclosed in U.S. Pat. No. 7,094,592); *Bacillus subtilis* MBI 600 (available as SUBTILEX® from Becker Underwood, U.S. EPA Reg. No. 71840-8); *Bacillus subtilis* Y1336 (available as BIOBAC® WP from Bion-Tech, Taiwan, registered as a biological fungicide in Taiwan under Registration Nos. 4764, 5454, 5096 and 5277); *Bacillus amyloliquefaciens*, in particular strain FZB42 (available as RHIZOVITAL® from ABiTEP, DE); and *Bacillus subtilis* var. *amyloliquefaciens* FZB24 (available from Novozymes Biologicals Inc., Salem, Virginia or Syngenta Crop Protection, LLC, Greensboro, North Carolina as the fungicide TAEGRO® or TAEGRO® ECO (EPA Registration No. 70127-5); and (B2) fungi, for example: (B2.1) *Coniothyrium minitans*, in particular strain CON/M/91-8 (Accession No. DSM-9660; e.g., CONTANS® from Bayer); (B2.2) *Metschnikowia fructicola*, in particular strain NRRL Y-30752 (e.g., SHEMER®); (B2.3) *Microsphaeropsis ochracea* (e.g., MICROX® from Prophyta); (B2.5) *Trichoderma* spp., including *Trichoderma atroviride*, strain SC1 described in International Application No. PCT/IT2008/000196); (B2.6) *Trichoderma harzianum rifai* strain KRL-AG2 (also known as strain T-22, /ATCC 208479, e.g., PLANTSHIELD T-22G, ROOTSHIELD®, and TURFSHIELD from BioWorks, US); (B2.14) *Gliocladium roseum*, strain 321U from W.F. Stoneman Company LLC; (B2.35) *Talaromyces flavus*, strain V117b; (B2.36) *Trichoderma asperellum*, strain ICC 012 from Isagro; (B2.37) *Trichoderma asperellum*, strain SKT-1 (e.g., ECO-HOPE® from Kumiai Chemical Industry); (B2.38) *Trichoderma atroviride*, strain CNCM I-1237 (e.g., ESQUIVE® WP from Agrauxine, FR); (B2.39) *Trichoderma atroviride*, strain no. V08/002387; (B2.40) *Trichoderma atroviride*, strain NMI no. V08/002388; (B2.41) *Trichoderma atroviride*, strain NMI no. V08/002389; (B2.42) *Trichoderma atroviride*, strain NMI no. V08/002390; (B2.43) *Trichoderma atroviride*, strain LC52 (e.g., TENET by Agrimm Technologies Limited); (B2.44) *Trichoderma atroviride*, strain ATCC 20476 (IMI 206040); (B2.45) *Trichoderma atroviride*, strain T11 (IMI352941/CECT20498); (B2.46) *Trichoderma harmatum*; (B2.47) *Trichoderma harzianum*; (B2.48) *Trichoderma harzianum rifai* T39 (e.g., TRICHODEX® from Makhteshim, US); (B2.49) *Trichoderma harzianum*, in particular, strain KD (e.g., Trichoplus from Biological Control Products, SA (acquired by Becker Underwood)); (B2.50) *Trichoderma harzianum*, strain ITEM 908 (e.g., TRIANUM-P from Koppert); (B2.51) *Trichoderma harzianum*, strain TH35 (e.g., ROOTPRO by Mycontrol); (B2.52) *Trichoderma virens* (also known as *Gliocladium virens*), in particular strain GL-21 (e.g., SOILGARD 12G by Certis, US); (B2.53) *Trichoderma viride*, strain TV1 (e.g., TRIANUM-P by Koppert); (B2.54) *Ampelomyces quisqualis*, in particular strain AQ 10 (e.g., AQ 10® by IntrachemBio Italia); (B2.56) *Aureobasidium pullulans*, in particular blastospores of strain DSM14940; (B2.57) *Aureobasidium pullulans*, in particular blastospores of strain DSM 14941; (B2.58) *Aureobasidium pullulans*, in particular mixtures of blastospores of strains DSM14940 and DSM 14941 (e.g., BOTECTOR® by bio-ferm, CH); (B2.64) *Cladosporium cladosporioides*, strain H39 (by Stichting Dienst Landbouwkundig Onderzoek); (B2.69) *Gliocladium catenulatum* (Synonym: *Clonostachys rosea* f. *catenulate*) strain J1446 (e.g., PRESTOP® by AgBio Inc. and also e.g., PRIMASTOP® by Kemira Agro Oy); (B2.70) *Lecanicillium lecanii* (formerly known as *Verticillium lecanii*) conidia of strain KV01 (e.g., VERTALEC® by Koppert/Arysta); (B2.71) *Penicillium vermiculatum*; (B2.72) *Pichia anomala*, strain WRL-076 (NRRL Y-30842); (B2.75) *Trichoderma atroviride*, strain SKT-1 (FERM P-16510); (B2.76) *Trichoderma atroviride*, strain SKT-2 (FERM P-16511); (B2.77) *Trichoderma atroviride*, strain SKT-3 (FERM P-17021); (B2.78) *Trichoderma gamsii* (formerly *T. viride*), strain ICC080 (IMI CC 392151 CABI, e.g., BioDerma by AGROBIOSOL DE MEXICO, S.A. DE C.V.); (B2.79) *Trichoderma harzianum*, strain DB 103 (e.g., T-GRO 7456 by Dagutat Biolab); (B2.80) *Trichoderma polysporum*, strain IMI 206039 (e.g., Binab TF WP by BINAB Bio-Innovation AB, Sweden); (B2.81) *Trichoderma stromaticum* (e.g., Tricovab by Ceplac, Brazil); (B2.83) *Ulocladium oudemansii*, in particular strain HRU3 (e.g., BOTRY-ZEN® by Botry-Zen Ltd, NZ); (B2.84) *Verticillium albo-atrum* (formerly *V. dahliae*), strain WCS850 (CBS 276.92; e.g., DUTCH TRIG by Tree Care Innovations); (B2.86) *Verticillium chlamydosporium*; (B2.87) mixtures of *Trichoderma asperellum* strain ICC 012 and *Trichoderma gamsii* strain ICC 080 (product known as e.g., BIO-TAM™ from Bayer CropScience LP, US).

Further examples of biological control agents which may be combined with the compound combination of the invention are:

bacteria selected from the group consisting of *Bacillus cereus*, in particular *B. cereus* strain CNCM I-1562 and *Bacillus firmus*, strain I-1582 (Accession number CNCM I-1582), *Bacillus subtilis* strain QST 30002 (Accession No. NRRL B-50421), *Bacillus thuringiensis*, in particular *B. thuringiensis* subspecies *israelensis* (serotype H-14), strain AM65-52 (Accession No. ATCC 1276), *B. thuringiensis* subsp. *aizawai*, in particular strain ABTS-1857 (SD-1372), *B. thuringiensis* subsp. *kurstaki* strain HD-1, *B. thuringiensis* subsp. *tenebrionis* strain NB 176 (SD-5428), *Pasteuria penetrans, Pasteuria* spp. (*Rotylenchulus reniformis* nematode)-PR3 (Accession Number ATCC SD-5834), *Streptomyces microflavus* strain AQ6121 (Accession No. NRRL B-50550), and *Streptomyces galbus* strain AQ 6047 (Accession Number NRRL 30232);

fungi and yeasts selected from the group consisting of *Beauveria bassiana*, in particular strain ATCC 74040, *Lecanicillium* spp., in particular strain HRO LEC 12, *Metarhizium anisopliae*, in particular strain F52 (DSM3884 or ATCC 90448), *Paecilomyces fumosoroseus* (now: *Isaria fumosorosea*), in particular strain IFPC 200613, or strain Apopka 97 (Accession No. ATCC 20874), and *Paecilomyces lilacinus*, in particular *P. lilacinus* strain 251 (AGAL 89/030550);

viruses selected from the group consisting of *Adoxophyes orana* (summer fruit *tortrix*) granulosis virus (GV), *Cydia pomonella* (codling moth) granulosis virus (GV), *Helicoverpa armigera* (cotton bollworm) nuclear polyhedrosis virus (NPV), *Spodoptera exigua* (beet armyworm) mNPV, *Spodoptera frugiperda* (fall armyworm) mNPV, and *Spodoptera littoralis* (African cotton leafworm) NPV.

bacteria and fungi which can be added as 'inoculant' to plants or plant parts or plant organs and which, by virtue of their particular properties, promote plant growth and plant health. Examples are: *Agrobacterium* spp., *Azorhizobium caulinodans*, *Azospirillum* spp., *Azotobacter* spp., *Bradyrhizobium* spp., *Burkholderia* spp., in particular *Burkholderia cepacia* (formerly known as *Pseudomonas cepacia*), *Gigaspora* spp., or *Gigaspora monosporum*, *Glomus* spp., *Laccaria* spp., *Lactobacillus buchneri*, *Paraglomus* spp., *Pisolithus tinctorus*, *Pseudomonas* spp., *Rhizobium* spp., in particular *Rhizobium trifolii*, *Rhizopogon* spp., *Scleroderma* spp., *Suillus* spp., and *Streptomyces* spp.

plant extracts and products formed by microorganisms including proteins and secondary metabolites which can be used as biological control agents, such as *Allium sativum, Artemisia absinthium*, azadirachtin, Biokeeper WP, *Cassia nigricans, Celastrus angulatus, Chenopodium anthelminticum*, chitin, Armour-Zen, *Dryopteris filix-mas, Equisetum arvense*, Fortune Aza, Fungastop, Heads Up (*Chenopodium quinoa* saponin extract), Pyrethrum/Pyrethrins, *Quassia amara, Quercus, Quillaja*, Regalia, "REQUIEM® Insecticide", rotenone, ryania/ryanodine, *Symphytum officinale, Tanacetum vulgare*, thymol, Triact 70, TriCon, *Tropaeulum majus, Urtica dioica*, Veratrin, *Viscum album, Brassicaceae* extract, in particular oilseed rape powder or mustard powder.

Examples of insecticides, acaricides and nematicides, respectively, which could be mixed with the compound combination of the invention are:

(1) Acetylcholinesterase (AChE) inhibitors, such as, for example, carbamates, for example alanycarb, aldicarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, triazamate, trimethacarb, XMC and xylylcarb; or organophosphates, for example acephate, azamethiphos, azinphos-ethyl, azinphos-methyl, cadusafos, chlorethoxyfos, chlorfenvinphos, chlormephos, chlorpyrifos-methyl, coumaphos, cyanophos, demeton-S-methyl, diazinon, dichlorvos/DDVP, dicrotophos, dimethoate, dimethylvinphos, disulfoton, EPN, ethion, ethoprophos, famphur, fenamiphos, fenitrothion, fenthion, fosthiazate, heptenophos, imicyafos, isofenphos, isopropyl O-(methoxyaminothiophosphoryl) salicylate, isoxathion, malathion, mecarbam, methamidophos, methidathion, mevinphos, monocrotophos, naled, omethoate, oxydemetonmethyl, parathion-methyl, phenthoate, phorate, phosalone, phosmet, phosphamidon, phoxim, pirimiphos-methyl, profenofos, propetamphos, prothiofos, pyraclofos, pyridaphenthion, quinalphos, sulfotep, tebupirimfos, temephos, terbufos, tetrachlorvinphos, thiometon, triazophos, triclorfon and vamidothion.
(2) GABA-gated chloride channel blockers, such as, for example, cyclodiene-organochlorines, for example chlordane and endosulfan or phenylpyrazoles (fiproles), for example ethiprole and fipronil.
(3) Sodium channel modulators, such as, for example, pyrethroids, e.g., acrinathrin, allethrin, d-cis-trans allethrin, d-trans allethrin, bifenthrin, bioallethrin, bioallethrin s-cyclopentenyl isomer, bioresmethrin, cycloprothrin, cyfluthrin, beta-cyfluthrin, cyhalothrin, lambda-cyhalothrin, gamma-cyhalothrin, cypermethrin, alpha-cypermethrin, beta-cypermethrin, theta-cypermethrin, zeta-cypermethrin, cyphenothrin [(1R)-trans-isomer], deltamethrin, empenthrin [(EZ)-(1R)-isomer], esfenvalerate, etofenprox, fenpropathrin, fenvalerate, flucythrinate, flumethrin, tau-fluvalinate, halfenprox, imiprothrin, kadethrin, momfluorothrin, permethrin, phenothrin [(1R)-trans-isomer], prallethrin, pyrethrins (*Pyrethrum*), resmethrin, silafluofen, tefluthrin, tetramethrin, tetramethrin [(1R)-isomer)], tralomethrin and transfluthrin or DDT or methoxychlor.
(4) Nicotinic acetylcholine receptor (nAChR) competitive modulators, such as, for example, neonicotinoids, e.g., acetamiprid, clothianidin, dinotefuran, imidacloprid, nitenpyram, thiacloprid and thiamethoxam or nicotine or sulfoxaflor or flupyradifurone.
(5) Nicotinic acetylcholine receptor (nAChR) allosteric modulators, such as, for example, spinosyns, e.g., spinetoram and spinosad.
(6) Glutamate-gated chloride channel (GluCl) allosteric modulators, such as, for example, avermectins/milbemycins, for example abamectin, emamectin benzoate, lepimectin and milbemectin.
(7) Juvenile hormone mimics, such as, for example, juvenile hormone analogues, e.g., hydroprene, kinoprene and methoprene or fenoxycarb or pyriproxyfen.
(8) Miscellaneous non-specific (multi-site) inhibitors, such as, for example, alkyl halides, e.g., methyl bromide and other alkyl halides; or chloropicrine or sulphuryl fluoride or borax or tartar emetic or methyl isocyanate generators, e.g., diazomet and metam.
(9) Modulators of Chordotonal Organs, such as, for example pymetrozine or flonicamid.
(10) Mite growth inhibitors, such as, for example clofentezine, hexythiazox and diflovidazin or etoxazole.
(11) Microbial disruptors of the insect gut membrane, such as, for example *Bacillus thuringiensis* subspecies *israelensis, Bacillus sphaericus, Bacillus thuringiensis* subspecies *aizawai, Bacillus thuringiensis* subspecies *kurstaki, Bacillus thuringiensis* subspecies *tenebrionis*, and B.t. plant proteins: Cry1Ab, Cry1Ac, Cry1Fa, Cry1A.105, Cry2Ab, Vip3A, mCry3A, Cry3Ab, Cry3Bb, Cry34Ab1/35Ab1.
(12) Inhibitors of mitochondrial ATP synthase, such as, ATP disruptors such as, for example, diafenthiuron or organotin compounds, for example azocyclotin, cyhexatin and fenbutatin oxide or propargite or tetradifon.
(13) Uncouplers of oxidative phosphorylation via disruption of the proton gradient, such as, for example, chlorfenapyr, DNOC and sulfluramid.
(14) Nicotinic acetylcholine receptor channel blockers, such as, for example, bensultap, cartap hydrochloride, thiocylam, and thiosultap-sodium.
(15) Inhibitors of chitin biosynthesis, type 0, such as, for example, bistrifluron, chlorfluazuron, diflubenzuron, flucycloxuron, flufenoxuron, hexaflumuron, lufenuron, novaluron, noviflumuron, teflubenzuron and triflumuron.
(16) Inhibitors of chitin biosynthesis, type 1, for example buprofezin.
(17) Moulting disruptor (in particular for Diptera, i.e., dipterans), such as, for example, cyromazine.
(18) Ecdysone receptor agonists, such as, for example, chromafenozide, halofenozide, methoxyfenozide and tebufenozide.
(19) Octopamine receptor agonists, such as, for example, amitraz.
(20) Mitochondrial complex III electron transport inhibitors, such as, for example, hydramethylnone or acequinocyl or fluacrypyrim.
(21) Mitochondrial complex I electron transport inhibitors, such as, for example from the group of the METI acaricides, e.g., fenazaquin, fenpyroximate, pyrimidifen, pyridaben, tebufenpyrad and tolfenpyrad or rotenone (Derris).
(22) Voltage-dependent sodium channel blockers, such as, for example indoxacarb or metaflumizone.
(23) Inhibitors of acetyl CoA carboxylase, such as, for example, tetronic and tetramic acid derivatives, e.g., spirodiclofen, spiromesifen and spirotetramat.
(24) Mitochondrial complex IV electron transport inhibitors, such as, for example, phosphines, e.g., aluminium phosphide, calcium phosphide, phosphine and zinc phosphide or cyanides, e.g., calcium cyanide, potassium cyanide and sodium cyanide.
(25) Mitochondrial complex II electron transport inhibitors, such as, for example, beta-ketonitrile derivatives, e.g., cyenopyrafen and cyflumetofen and carboxanilides, such as, for example, pyflubumide.
(28) Ryanodine receptor modulators, such as, for example, diamides, e.g., chlorantraniliprole, cyantraniliprole and flubendiamide,
further active compounds such as, for example, Afidopyropen, Afoxolaner, Azadirachtin, Benclothiaz, Benzoximate, Bifenazate, Broflanilide, Bromopropylate, Chinomethionat, Chloroprallethrin, Cryolite, Cyclaniliprole, Cycloxaprid, Cyhalodiamide, Dicloromezotiaz, Dicofol, epsilon-Metofluthrin, epsilon-Momfluthrin, Flometoquin, Fluazaindolizine, Fluensulfone, Flufenerim, Flufenoxystrobin, Flufiprole, Fluhexafon, Fluopyram, Fluralaner, Fluxametamide, Fufenozide, Guadipyr, Heptafluthrin, Imidaclothiz, Iprodione, kappa-Bifenthrin, kappa-Tefluthrin, Lotilaner, Meperfluthrin, Paichongding, Pyridalyl, Pyrifluquinazon, Pyriminostrobin, Spirobudiclofen, Tetramethylfluthrin, Tetraniliprole, Tetrachlorantraniliprole, Tigolaner, Tioxazafen, Thiofluoximate, Triflumezopyrim and iodomethane; furthermore preparations based on *Bacillus firmus* (I-1582, BION-EEM®, VOTIVO®), and also the following compounds: 1-{2-fluoro-4-methyl-5-[(2,2,2-trifluoroethyl)sulphinyl] phenyl}-3-(trifluoromethyl)-1H-1,2,4-triazole-5-amine (known from WO 2006/043635) (CAS No. 885026-50-6), {1'-[(2E)-3-(4-chlorophenyl)prop-2-en-1-yl]-5-fluorospiro [indol-3,4'-piperidin]-1(2H)-yl}(2-chloropyridin-4-yl) methanone (known from WO 2003/106457) (CAS No. 637360-23-7), 2-chloro-N-[2-{1-[(2E)-3-(4-chlorophenyl) prop-2-en-1-yl]piperidin-4-yl}-4-(trifluoromethyl)phenyl] isonicotinamide (known from WO 2006/003494) (CAS 872999-66-1), 3-(4-chloro-2,6-dimethylphenyl)-4-hydroxy-8-methoxy-1,8-diazaspiro[4.5]dec-3-en-2-one (known from WO 2010/052161) (CAS 1225292-17-0), 3-(4-chloro-2,6dimethylphenyl)-8-methoxy-2-oxo-1,8-diazaspiro[4.5]dec-3-en-4-yl ethyl carbonate (known from EP2647626) (CAS 1440516-42-6), 4-(but-2-yn-1-yloxy)-6-(3,5-dimethylpiperidin-1-yl)-5-fluoropyrimidine (known from WO 2004/099160) (CAS No. 792914-58-0), PF1364 (known from JP 2010/018586) (CAS No. 1204776-60-2), N-[(2E)-1-[(6-chloropyridin-3-yl)methyl]pyridin-2(1H)-ylidene]-2,2,2-trifluoroacetamide (known from WO 2012/029672) (CAS 1363400-41-2), (3E)-3-[1-[(6-chloro-3-pyridyl)methyl]-2-pyridylidene]-1,1,1-trifluoro-propan-2-one (known from WO 2013/144213) (CAS No. 1461743-15-6), N-[3-(benzylcarbamoyl)-4-chlorophenyl]-1-methyl-3-(pentafluoroethyl)-4-(trifluoromethyl)-1H-pyrazole-5-carboxamide (known from WO 2010/051926) (CAS No. 1226889-14-0), 5-bromo-4-chloro-N-[4-chloro-2-methyl-6-(methylcarbamoyl)phenyl]-2-(3-chloro-2-pyridyl)pyrazole-3-carboxamide (known from CN 103232431) (CAS No. 1449220-44-3), 4-[5-(3,5-dichlorophenyl)-4,5-dihydro-5-(trifluoromethyl)-3-isoxazolyl]-2-methyl-N-(cis-1-oxido-3-thietanyl)-benzamide, 4-[5-(3,5-dichlorophenyl)-4,5-dihydro-5-(trifluoromethyl)-3-isoxazolyl]-2-methyl-N-(trans-1-oxido-3-thietanyl)-benzamide and 4-[(5S)-5-(3,5-dichlorophenyl)-4,5-dihydro-5-(trifluoromethyl)-3-isoxazolyl]-2-methyl-N-(cis-1-oxido-3-thietanyl)benzamide (known from WO 2013/050317 A1) (CAS No. 1332628-83-7), N-[3-chloro-1-(3-pyridinyl)-1H-pyrazol-4-yl]-N-ethyl-3-[(3,3,3-trifluoropropyl)sulfinyl]-propanamide, (+)-N-[3-chloro-1-(3-pyridinyl)-1H-pyrazol-4-yl]-N-ethyl-3-[(3,3,3-trifluoropropyl)sulfinyl]-propanamide and (−)-N-[3-chloro-1-(3-pyridinyl)-1H-pyrazol-4-yl]-N-ethyl-3-[(3,3,3-trifluoropropyl)sulfinyl-propanamide (known from WO 2013/162715 A2, WO 2013/162716 A2, U.S. Patent Application Publication No. 2014/0213448 A1) (CAS No. 1477923-37-7), 5-[[(2E)-3-chloro-2-propen-1-yl]amino]-1-[2,6-dichloro-4-(trifluoromethyl)phenyl]-4-[(trifluoromethyl)sulfinyl]-1H-pyrazole-3-carbonitrile (known from CN 101337937 A) (CAS 1105672-77-2), 3-bromo-N-[4-chloro-2-methyl-6-[(methylamino)thioxomethyl]phenyl]-1-(3-chloro-2-pyridinyl)-1H-pyrazole-5-carboxamide, (Liudaibenjiaxuanan, known from CN 103109816 A) (CAS No. 1232543-85-9); N-[4-chloro-2-[[(1,1-dimethylethyl)amino]carbonyl]-6-methylphenyl]-1-(3-chloro-2-pyridinyl)-3-(fluoromethoxy)-1H-Pyrazole-5-carboxamide (known from WO 2012/034403 A1) (CAS No. 1268277-22-0), N-[2-(5-amino-1,3,4-thiadiazol-2-yl)-4-chloro-6-methylphenyl]-3-bromo-1-(3-chloro-2-pyridinyl)-1H-pyrazole-5-carboxamide (known from WO 2011/085575 A1) (CAS No. 1233882-22-8), 4-[3-[2,6-dichloro-4-[(3,3-dichloro-2-propen-1-yl)oxy]phenoxy]propoxy]-2-methoxy-6-(trifluoromethyl)-pyrimidine (known from CN 101337940 A) (CAS No. 1108184-52-6); (2E)- and (2Z)-2-[2-(4-cyanophenyl)-1-[3-(trifluoromethyl)phenyl]ethylidene]-N-[4-(difluoromethoxy)phenyl]-hydrazinecarboxamide (known from CN 101715774 A) (CAS No. 1232543-85-9); 3-(2,2-dichloroethenyl)-2,2-dimethyl-4-(1H-benzimidazol-2-yl)phenyl-cyclopropanecarboxylic acid ester (known from CN 103524422 A) (CAS 1542271-46-4); (4aS)-7-chloro-2,5-dihydro-2-[[(methoxycarbonyl)[4-[(trifluoromethyl)thio]phenyl]amino]carbonyl]-indeno[1,2-e][1,3,4]oxadiazine-4a (3H)-carboxylic acid methyl ester (known from CN 102391261 A) (CAS No, 1370358-69-2); 6-deoxy-3-O-ethyl-2,4-di-O-methyl-, 1-[N-[4-[1-[4-(1,1,2,2,2-pentafluoroethoxy)phenyl]-1H-1,2,4-triazol-3-yl]phenyl]carbamate]-α-L-mannopyranose (known from U.S. Patent Application Publication No. 2014/0275503 A1) (CAS 1181213-14-8); 8-(2-cyclopropylmethoxy-4-trifluoromethyl-phenoxy)-3-(6-trifluoromethyl-pyridazin-3-yl)-3-aza-bicyclo[3.2.1]octane (CAS No. 1253850-56-4), (8-anti)-8-(2-cyclopropyl-methoxy-4-trifluoromethyl-phenoxy)-3-(6-trifluoromethyl-pyridazin-3-yl)-3-aza-bicyclo[3.2.1]octane (CAS No. 933798-27-7), (8-syn)-8-(2-cyclopropylmethoxy-4-trifluoromethyl-phenoxy)-3-(6-trifluoromethyl-pyridazin-3-yl)-3-aza-bicyclo[3.2.1]octane (known from WO 2007/040280 A1, WO 2007/040282 A1) (CAS No. 934001-66-8), N-[3-chloro-1-(3-pyridinyl)-1H-pyrazol-4-yl]-N-ethyl-3-[(3,3,3-trifluoropropyl)thio]-propanamide (known from WO 2015/058021 A1, WO 2015/058028 A1) (CAS No. 1477919-27-9) and N-[4-(aminothioxomethyl)-2-methyl-6-[(methylamino)carbonyl]phenyl]-3-bromo-1-(3-chloro-2-pyridinyl)-1H-pyrazole-5-carboxamide (known from CN 103265527 A) (CAS 1452877-50-7), 5-(1,3-dioxan-2-yl)-4-[[4-(trifluoromethyl)phenyl]methoxy]-pyrimidine (known from WO 2013/115391 A1) (CAS 1449021-97-9), 3-(4-chloro-2,6-dimethylphenyl)-4-hydroxy-8-methoxy-1-methyl-1,8-diazaspiro[4.5]dec-3-en-2-one (known from WO 2010/066780 A1, WO 2011/151146 A1) (CAS No. 1229023-34-0), 3-(4-chloro-2,6-dimethylphenyl)-8-methoxy-1-methyl-1,8-diazaspiro[4.5]decane-2,4-dione (known from WO 2014/187846 A1) (CAS No. 1638765-58-8), 3-(4-chloro-2,6-dimethylphenyl)-8-methoxy-1-methyl-2-oxo-1,8-diazaspiro[4.5]dec-3-en-4-yl-carbonic acid ethyl ester (known from WO 2010/066780 A1, WO 2011/151146 A1) (CAS 1229023-00-0), N-[1-[(6-chloro-3-pyridinyl)methyl]-2(1H)-pyridinylidene]-2,2,2-trifluoro-acetamide (known from DE 3639877 A1, WO 2012/029672 A1) (CAS No. 1363400-41-2), [N(E)]-N-[1-[(6-chloro-3-pyridinyl)methyl]-2(1H)-pyridinylidene]-2,2,2-trifluoro-acetamide, (known from WO 2016/005276 A1) (CAS No. 1689566-03-7), [N(Z)]—N-[1-[(6-chloro-3-pyridinyl)methyl]-2(1H)-pyridinylidene]-2,2,2-trifluoro-acetamide, (CAS No. 1702305-40-5), 3-endo-3-[2-propoxy-4-(trifluoromethyl)phenoxy]-9-[[5-(trifluoromethyl)-2-pyridinyl]oxy]-9-azabicyclo[3.3.1]nonane (known from WO 2011/105506 A1, WO 2016/133011 A1) (CAS No, 1332838-17-1).

Examples of safeners which could be mixed with the compound combination of the invention are, for example, benoxacor, cloquintocet (-mexyl), cyometrinil, cyprosulfamide, dichlormid, fenchlorazole (-ethyl), fenclorim, flurazole, fluxofenim, furilazole, isoxadifen (-ethyl), mefenpyr (-diethyl), naphthalic anhydride, oxabetrinil, 2-methoxy-N-({4-[(methylcarbamoyl)amino]phenyl}sulphonyl)benzamide (CAS No. 129531-12-0), 4-(dichloroacetyl)-1-oxa-4-azaspiro[4.5]decane (CAS No. 71526-07-3), 2,2,5-trimethyl-3-(dichloroacetyl)-1,3-oxazolidine (CAS No. 52836-31-4).

Examples of herbicides which could be mixed with the compound combination of the invention are:

Acetochlor, acifluorfen, acifluorfen-sodium, aclonifen, alachlor, allidochlor, alloxydim, alloxydim-sodium, ametryn, amicarbazone, amidochlor, amidosulfuron, 4-amino-3-chloro-6-(4-chloro-2-fluoro-3-methylphenyl)-5-fluoropyridine-2-carboxylic acid, aminocyclopyrachlor, aminocyclopyrachlor-potassium, aminocyclopyrachlor-methyl, aminopyralid, amitrole, ammoniumsulfamate, anilofos, asulam, atrazine, azafenidin, azimsulfuron, beflubutamid, benazolin, benazolin-ethyl, benfluralin, benfuresate, bensulfuron, bensulfuron-methyl, bensulide, bentazone, benzobicyclon, benzofenap, bicyclopyron, bifenox, bilanafos, bilanafos-sodium, bispyribac, bispyribac-sodium, bromacil, bromobutide, bromofenoxim, bromoxynil, bromoxynil-butyrate, -potassium, -heptanoate, and -octanoate, busoxinone, butachlor, butafenacil, butamifos, butenachlor, butralin, butroxydim, butylate, cafenstrole, carbetamide, carfentrazone, carfentrazone-ethyl, chloramben, chlorbromuron, chlorfenac, chlorfenac-sodium, chlorfenprop, chlorflurenol, chlorflurenol-methyl, chloridazon, chlorimuron, chlorimuron-ethyl, chlorophthalim, chlorotoluron, chlorthal-dimethyl, chlorsulfuron, cinidon, cinidon-ethyl, cinmethylin, cinosulfuron, clacyfos, clethodim, clodinafop, clodinafop-propargyl, clomazone, clomeprop, clopyralid, cloransulam, cloransulam-methyl, cumyluron, cyanamide, cyanazine, cycloate, cyclopyrimorate, cyclosulfamuron, cycloxydim, cyhalofop, cyhalofop-butyl, cyprazine, 2,4-D, 2,4-D-butotyl, -butyl, -dimethylammonium, -diolamin, -ethyl, -2-ethylhexyl, -isobutyl, -isooctyl, -isopropylammonium, -potassium, -triisopropanolammonium, and -trolamine, 2,4-DB, 2,4-DB-butyl, -dimethylammonium, -isooctyl, -potassium, and -sodium, daimuron (dymron), dalapon, dazomet, n-decanol, desmedipham, detosyl-pyrazolate (DTP), dicamba, dichlobenil, 2-(2,4-dichlorobenzyl)-4,4-dimethyl-1,2-oxazolidin-3-one, 2-(2,5-dichlorobenzyl)-4,4-dimethyl-1,2-oxazolidin-3-one, dichlorprop, dichlorprop-P, diclofop, diclofop-methyl, diclofop-P-methyl, diclosulam, difenzoquat, diflufenican, diflufenzopyr, diflufenzopyr-sodium, dimefuron, dimepiperate, dimethachlor, dimethametryn, dimethenamid, dimethenamid-P, dimetrasulfuron, dinitramine, dinoterb, diphenamid, diquat, diquat-dibromid, dithiopyr, diuron, DNOC, endothal, EPTC, esprocarb, ethalfluralin, ethametsulfuron, ethaetsulfuron-methyl, ethiozin, ethofumesate, ethoxyfen, ethoxyfen-ethyl, ethoxysulfuron, etobenzanid, F-9600, F-5231, i.e., N-{2-chloro-4-fluoro-5-[4-(3-fluoropropyl)-5-oxo-4,5-dihydro-1H-tetrazol-1-yl]phenyl}ethanesulfonamide, F-7967, i. e. 3-[7-chloro-5-fluoro-2-(trifluoromethyl)-1H-benzimidazol-4-yl]-1-methyl-6-(trifluoromethyl)pyrimidine-2,4(1H,3H)-dione, fenoxaprop, fenoxaprop-P, fenoxaprop-ethyl, fenoxaprop-P-ethyl, fenoxasulfone, fenquinotrione, fentrazamide, flamprop, flamprop-M-isopropyl, flamprop-M-methyl, flazasulfuron, florasulam, fluazifop, fluazifop-P, fluazifop-butyl, fluazifop-P-butyl, flucarbazone, flucarbazone-sodium, flucetosulfuron, fluchloralin, flufenacet, flufenpyr, flufenpyr-ethyl, flumetsulam, flumiclorac, flumiclorac-pentyl, flumioxazin, fluometuron, flurenol, flurenol-butyl, -dimethylammonium and -methyl, fluoroglycofen, fluoroglycofen-ethyl, flupropanate, flupyrsulfuron, flupyrsulfuron-methyl-sodium, fluridone, flurochloridone, fluroxypyr, fluroxypyr-meptyl, flurtamone, fluthiacet, fluthiacet-methyl, fomesafen, fomesafen-sodium, foramsulfuron, fosamine, glufosinate, glufosinate-ammonium, glufosinate-P-sodium, glufosinate-P-ammonium, glufosinate-P-sodium, glyphosate, glyphosate-ammonium, -isopropylammonium, -diammonium, -dimethylammonium, -potassium, -sodium, and -trimesium, H-9201, i.e., O-(2,4-dimethyl-6-nitrophenyl)O-ethyl isopropylphosphoramidothioate, halauxifen, halauxifen-methyl, halosafen, halosulfuron, halosulfuron-methyl, haloxyfop, haloxyfop-P, haloxyfop-ethoxyethyl, haloxyfop-P-ethoxyethyl, haloxyfop-methyl, haloxyfop-P-methyl, hexazinone, HW-02, i.e., 1-(dimethoxyphosphoryl)ethyl-(2,4-dichlorophenoxy)acetate, imazamethabenz, imazamethabenz-methyl, imazamox, imazamox-ammonium, imazapic, imazapic-ammonium, imazapyr, imazapyr-isopropylammonium, imazaquin, imazaquin-ammonium, imazethapyr, imazethapyr-immonium, imazosulfuron, indanofan, indaziflam, iodosulfuron, iodosulfuron-methyl-sodium, ioxynil, ioxynil-octanoate, -potassium and -sodium, ipfencarbazone, isoproturon, isouron, isoxaben, isoxaflutole, karbutilate, KUH-043, i.e., 3-({[5-(difluoromethyl)-1-methyl-3-(trifluoromethyl)-1H-pyrazol-4-yl]methyl}sulfonyl)-5,5-dimethyl-4,5-dihydro-1,2-oxazole, ketospiradox, lactofen, lenacil, linuron, MCPA, MCPA-butotyl, -dimethylammonium, -2-ethylhexyl, -isopropylammonium, -potassium, and -sodium, MCPB, MCPB-methyl, -ethyl and -sodium, mecoprop, mecoprop-sodium, and -butotyl, mecoprop-P, mecoprop-P-butotyl, -dimethylammonium, -2-ethylhexyl, and -potassium, mefenacet, mefluidide, mesosulfuron, mesosulfuron-methyl, mesotrione, methabenzthiazuron, metam, metamifop, metamitron, metazachlor, metazosulfuron, methabenzthiazuron, methiopyrsulfuron, methiozolin, methyl isothiocyanate, metobromuron, metolachlor, S-metolachlor, metosulam, metoxuron, metribuzin, metsulfuron, metsulfuron-methyl, molinat, monolinuron, monosulfuron, monosulfuron-ester, MT-5950, i.e., N-(3-chloro-4-isopropylphenyl)-2-methylpentan amide, NGGC-011, napropamide, NC-310, i.e., [5-(benzyloxy)-1-methyl-1H-pyrazol-4-yl](2,4-dichlorophenyl)methanone, neburon, nicosulfuron, nonanoic acid (pelargonic acid), norflurazon, oleic acid (fatty acids), orbencarb, orthosulfamuron, oryzalin, oxadiargyl, oxadiazon, oxasulfuron, oxaziclomefon, oxyfluorfen, paraquat, paraquat dichloride, pebulate, pendimethalin, penoxsulam, pentachlorphenol, pentoxazone, pethoxamid, petroleum oils, phenmedipham, picloram, picolinafen, pinoxaden, piperophos, pretilachlor, primisulfuron, primisulfuron-methyl, prodiamine, profoxydim, prometon, prometryn, propachlor, propanil, propaquizafop, propazine, propham, propisochlor, propoxycarbazone, propoxycarbazone-sodium, propyrisulfuron, propyzamide, prosulfocarb, prosulfuron, pyraclonil, pyraflufen, pyraflufen-ethyl, pyrasulfotole, pyrazolynate (pyrazolate), pyrazosulfuron, pyrazosulfuron-ethyl, pyrazoxyfen, pyribambenz, pyribambenz-isopropyl, pyribambenz-propyl, pyribenzoxim, pyributicarb, pyridafol, pyridate, pyriftalid, pyriminobac, pyriminobac-methyl, pyrimisulfan, pyrithiobac, pyrithiobac-sodium, pyroxasulfone, pyroxsulam, quinclorac, quinmerac, quinoclamine, quizalofop, quizalofop-ethyl, quizalofop-P, quizalofop-P-ethyl, quizalofop-P-tefuryl, rimsulfuron, saflufenacil, sethoxydim, siduron, simazine, simetryn, SL-261, sulcotrion, sulfentrazone, sulfometuron, sulfometuron-methyl, sulfosulfuron, SYN-523, SYP-249, i.e., 1-ethoxy-3-methyl-1-oxobut-3-en-2-yl 5-[2-chloro-4-(trifluoromethyl)phenoxy]-2-nitrobenzoate, SYP-300, i.e., 1-[7-fluoro-3-oxo-4-(prop-2-yn-1-yl)-3,4-dihydro-2H-1,4-benzoxazin-6-yl]-3-propyl-2-thioxoimidazolidine-4,5-dione, 2,3,6-TBA, TCA (trichloroacetic acid), TCA-sodium, tebuthiuron, tefuryltrione, tembotrione, tepraloxydim, terbacil, terbucarb, terbumeton, terbuthylazin, terbutryn, thenylchlor, thiazopyr, thiencarbazone, thiencarbazone-methyl, thifensulfuron, thifensulfuron-methyl, thiobencarb, tiafenacil, tolpyralate, topramezone, tralkoxydim, triafamone, tri-allate, triasulfuron, triaziflam, tribenuron, tribenuron-methyl, triclopyr, trietazine, trifloxysulfuron, trifloxysulfuron-sodium, trifludimoxazin, trifluralin, triflusulfuron, triflusulfuron-methyl, tritosulfuron, urea sulfate, vernolate, XDE-848, ZJ-0862, i.e., 3,4-dichloro-N-{2-[(4,6-dimethoxypyrimidin-2-yl)oxy]benzyl}aniline, and the following compounds:

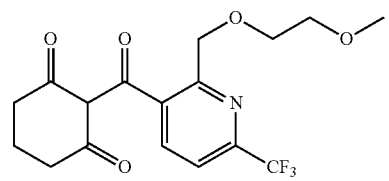

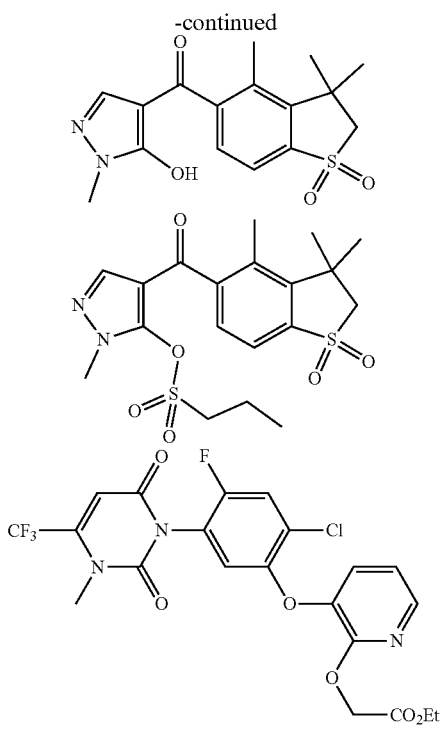

Examples for plant growth regulators are:

Acibenzolar, acibenzolar-S-methyl, 5-aminolevulinic acid, ancymidol, 6-benzylaminopurine, Brassinolid, catechine, chlormequat chloride, cloprop, cyclanilide, 3-(cycloprop-1-enyl) propionic acid, daminozide, dazomet, n-decanol, dikegulac, dikegulac-sodium, endothal, endothal-dipotassium, -disodium, and -mono(N,N-dimethylalkylammonium), ethephon, flumetralin, flurenol, flurenol-butyl, flurprimidol, forchlorfenuron, gibberellic acid, inabenfide, indol-3-acetic acid (IAA), 4-indol-3-ylbutyric acid, isoprothiolane, probenazole, jasmonic acid, maleic hydrazide, mepiquat chloride, 1-methylcyclopropene, methyl jasmonate, 2-(1-naphthyl)acetamide, 1-naphthylacetic acid, 2-naphthyloxyacetic acid, nitrophenolate-mixture, paclobutrazol, N-(2-phenylethyl)-beta-alanine, N-phenylphthalamic acid, prohexadione, prohexadione-calcium, prohydrojasmone, salicylic acid, strigolactone, tecnazene, thidiazuron, triacontanol, trinexapac, trinexapac-ethyl, tsitodef, uniconazole, uniconazole-P.

Methods and Uses

The invention also relates to a method for controlling phytopathogenic fungi, characterized in that a compound combination comprising (A) Fluopyram, (B) Prothioconazole and (C) Trifloxystrobin or Tebuconazole or a composition comprising such combination is applied to the phytopathogenic fungi and/or their habitat.

The invention further relates to seed which has been treated with a compound combination or a composition comprising such combination.

The invention finally provides a method for protecting seed against phytopathogenic fungi by treating seed with a compound combination according to the invention or a composition comprising such combination.

The compound combinations comprising (A) Fluopyram, (B) Prothioconazole and (C) Trifloxystrobin and compositions comprising such combination have potent fungicidal activity and can be used for control of phytopathogenic fungi in agriculture.

The compound combinations comprising (A) Fluopyram, (B) Prothioconazole and (C) Tebuconazole and compositions comprising such combination have potent fungicidal activity and can be used for control of phytopathogenic fungi in agriculture.

The compound combinations comprising (A) Fluopyram, (B) Prothioconazole and (C) Trifloxystrobin and compositions comprising such combination have very good fungicidal properties and can be used in crop protection, for example for control of Plasmodiophoromycetes, Oomycetes, Chytridiomycetes, Zygomycetes, Ascomycetes, Basidiomycetes and Deuteromycetes.

The compound combinations comprising (A) Fluopyram, (B) Prothioconazole and (C) Trifloxystrobin and compositions comprising such combination have very good fungicidal properties and can be used in crop protection for control of *Cercospora* species.

The compound combinations comprising (A) Fluopyram, (B) Prothioconazole and (C) Trifloxystrobin and compositions comprising such combination have very good fungicidal properties and can be used in crop protection for control of *Cercospora zeae-maydis* in corn.

The compound combinations comprising (A) Fluopyram, (B) Prothioconazole and (C) Trifloxystrobin and compositions comprising such combination have very good fungicidal properties and can be used in crop protection for control of *Colletotrichum graminicola* in corn.

The compound combinations comprising (A) Fluopyram, (B) Prothioconazole and (C) Trifloxystrobin and compositions comprising such combination have very good fungicidal properties and can be used in crop protection for control of *Kabatiella zeae* in corn.

The compound combinations comprising (A) Fluopyram, (B) Prothioconazole and (C) Trifloxystrobin and compositions comprising such combination have very good fungicidal properties and can be used in crop protection for control of *Cochiobolus heterostrophus* in corn.

The compound combinations comprising (A) Fluopyram, (B) Prothioconazole and (C) Trifloxystrobin and compositions comprising such combination have very good fungicidal properties and can be used in crop protection for control of *Puccinia sorghi* in corn.

The compound combinations comprising (A) Fluopyram, (B) Prothioconazole and (C) Trifloxystrobin and compositions comprising such combination have very good fungicidal properties and can be used in crop protection for control of *Puccinia polysora* in corn.

The compound combinations comprising (A) Fluopyram, (B) Prothioconazole and (C) Trifloxystrobin and compositions comprising such combination have very good fungicidal properties and can be used in crop protection for control of *Kabatiella zeae* in corn.

The compound combinations comprising (A) Fluopyram, (B) Prothioconazole and (C) Trifloxystrobin and compositions comprising such combination have very good fungicidal properties and can be used in crop protection for control of *Exserohilum turcicum* in corn.

The compound combinations comprising (A) Fluopyram, (B) Prothioconazole and (C) Trifloxystrobin and compositions comprising such combination have very good fungicidal properties and can be used in crop protection for control of *Phyllachora maydis* in corn.

The compound combinations comprising (A) Fluopyram, (B) Prothioconazole and (C) Trifloxystrobin and compositions comprising such combination have very good fungicidal properties and can be used in crop protection for control of stalk rot pathogens such as *Fusarium* spp., *Giberella* spp. and *Colleotrichum* spp. in corn.

The compound combinations comprising (A) Fluopyram, (B) Prothioconazole and (C) Trifloxystrobin and compositions comprising such combination have very good fungicidal properties and can be used in crop protection for control of ear rot pathogens such as *Fusarium* spp. and *Giberella* spp. in corn.

The compound combinations comprising (A) Fluopyram, (B) Prothioconazole and (C) Trifloxystrobin and compositions comprising such combination have very good fungicidal properties and can be used in crop protection for control of *Cercospora sojina* in soybean.

The compound combinations comprising (A) Fluopyram, (B) Prothioconazole and (C) Trifloxystrobin and compositions comprising such combination have very good fungicidal properties and can be used in crop protection for control of *Septoria glycines* in soybean.

The compound combinations comprising (A) Fluopyram, (B) Prothioconazole and (C) Trifloxystrobin and compositions comprising such combination have very good fungicidal properties and can be used in crop protection for control of *Phakopsora pachyrhizi* in soybean.

The compound combinations comprising (A) Fluopyram, (B) Prothioconazole and (C) Trifloxystrobin and compositions comprising such combination have very good fungicidal properties and can be used in crop protection for control of *Cercospora sojina* in soybean.

The compound combinations comprising (A) Fluopyram, (B) Prothioconazole and (C) Trifloxystrobin and compositions comprising such combination have very good fungicidal properties and can be used in crop protection for control of *Septoria glycines* in soybean.

The compound combinations comprising (A) Fluopyram, (B) Prothioconazole and (C) Trifloxystrobin and compositions comprising such combination have very good fungicidal properties and can be used in crop protection for control of *Phomopsis longicolla* in soybean.

The compound combinations comprising (A) Fluopyram, (B) Prothioconazole and (C) Trifloxystrobin and compositions comprising such combination have very good fungicidal properties and can be used in crop protection for control of *Sclerotinia sclerotiorum* in soybean.

The compound combinations comprising (A) Fluopyram, (B) Prothioconazole and (C) Trifloxystrobin and compositions comprising such combination have very good fungicidal properties and can be used in crop protection for control of *Septoria tritici* in wheat, in particular in winter wheat or durum.

The compound combinations comprising (A) Fluopyram, (B) Prothioconazole and (C) Trifloxystrobin and compositions comprising such combination have very good fungicidal properties and can be used in crop protection for control of *Erysiphe graminis* in wheat, in particular in winter wheat or durum.

The compound combinations comprising (A) Fluopyram, (B) Prothioconazole and (C) Trifloxystrobin and compositions comprising such combination have very good fungicidal properties and can be used in crop protection for control of *Puccinia graminis* in wheat, in particular in winter wheat or durum.

The compound combinations comprising (A) Fluopyram, (B) Prothioconazole and (C) Trifloxystrobin and compositions comprising such combination have very good fungicidal properties and can be used in crop protection for control of *Pyrenophora tritici-repentis* in wheat, in particular in winter wheat or durum.

The compound combinations comprising (A) Fluopyram, (B) Prothioconazole and (C) Trifloxystrobin and compositions comprising such combination have very good fungicidal properties and can be used in crop protection for control of *Puccinia striiformis* in wheat, in particular in winter wheat or durum.

The compound combinations comprising (A) Fluopyram, (B) Prothioconazole and (C) Trifloxystrobin and compositions comprising such combination have very good fungicidal properties and can be used in crop protection for control of *Puccinia triticina* in wheat, in particular in winter wheat or durum.

The compound combinations comprising (A) Fluopyram, (B) Prothioconazole and (C) Trifloxystrobin and compositions comprising such combination have very good fungicidal properties and can be used in crop protection for control of *Puccinia graminis* in barley.

The compound combinations comprising (A) Fluopyram, (B) Prothioconazole and (C) Trifloxystrobin and compositions comprising such combination have very good fungicidal properties and can be used in crop protection for control of *Pyrenophora teres* in barley.

The compound combinations comprising (A) Fluopyram, (B) Prothioconazole and (C) Trifloxystrobin and compositions comprising such combination have very good fungicidal properties and can be used in crop protection for control of *Puccinia striiformis* in barley.

The compound combinations comprising (A) Fluopyram, (B) Prothioconazole and (C) Trifloxystrobin and compositions comprising such combination have very good fungicidal properties and can be used in crop protection for control of *Puccinia hordei* in barley.

The compound combinations comprising (A) Fluopyram, (B) Prothioconazole and (C) Trifloxystrobin and compositions comprising such combination have very good fungicidal properties and can be used in crop protection for control of *Rhynchosporium secalis* in barley.

The compound combinations comprising (A) Fluopyram, (B) Prothioconazole and (C) Trifloxystrobin and compositions comprising such combination have very good fungicidal properties and can be used in crop protection for control of *Erysiphe graminis* in barley.

The compound combinations comprising (A) Fluopyram, (B) Prothioconazole and (C) Trifloxystrobin and compositions comprising such combination have very good fungicidal properties and can be used in crop protection for control of *Rhynchosporium secalis* in rye.

The compound combinations comprising (A) Fluopyram, (B) Prothioconazole and (C) Trifloxystrobin and compositions comprising such combination have very good fungicidal properties and can be used in crop protection for control of *Puccinia graminis* in triticale.

The compound combinations comprising (A) Fluopyram, (B) Prothioconazole and (C) Trifloxystrobin and compositions comprising such combination have very good fungicidal properties and can be used in crop protection for control of *Puccinia coronata* in oats.

The compound combinations comprising (A) Fluopyram, (B) Prothioconazole and (C) Trifloxystrobin and compositions comprising such combination have very good fungicidal properties and can be used in crop protection for control of *Puccinia graminis* in oats.

The compound combinations comprising (A) Fluopyram, (B) Prothioconazole and (C) Trifloxystrobin and compositions comprising such combination have very good fungicidal properties and can be used in crop protection for control of *Septoria avenae* in oats.

The compound combinations comprising (A) Fluopyram, (B) Prothioconazole and (C) Trifloxystrobin and compositions comprising such combination have very good fungicidal properties and can be used in crop protection for control of *Colletotrichum truncatum* in lentils.

The compound combinations comprising (A) Fluopyram, (B) Prothioconazole and (C) Trifloxystrobin and compositions comprising such combination have very good fungicidal properties and can be used in crop protection for control of *Aschochyta lentis* in lentils.

The compound combinations comprising (A) Fluopyram, (B) Prothioconazole and (C) Trifloxystrobin and compositions comprising such combination have very good fungicidal properties and can be used in crop protection for control of *Sclerotinia sclerotiorum* in lentils.

The compound combinations comprising (A) Fluopyram, (B) Prothioconazole and (C) Trifloxystrobin and compositions comprising such combination have very good fungicidal properties and can be used in crop protection for control of *Mycosphaerella pinodes* in field peas.

The compound combinations comprising (A) Fluopyram, (B) Prothioconazole and (C) Trifloxystrobin and compositions comprising such combination have very good fungicidal properties and can be used in crop protection for control of *Sclerotinia sclerotiorum* in field peas.

The compound combinations comprising (A) Fluopyram, (B) Prothioconazole and (C) Trifloxystrobin and compositions comprising such combination have very good fungicidal properties and can be used in crop protection for control of *Erysiphe pisi* in field peas.

The compound combinations comprising (A) Fluopyram, (B) Prothioconazole and (C) Trifloxystrobin and compositions comprising such combination have very good fungicidal properties and can be used in crop protection for control of *Puccinia substriata* in millet.

The compound combinations comprising (A) Fluopyram, (B) Prothioconazole and (C) Tebuconazole and compositions comprising such combination have very good fungicidal properties and can be used in crop protection for control of *Fusarium graminearum* in wheat.

The compound combinations comprising (A) Fluopyram, (B) Prothioconazole and (C) Tebuconazole and compositions comprising such combination have very good fungicidal properties and can be used in crop protection for control of *Fusarium graminearum* in barley.

The compound combinations comprising (A) Fluopyram, (B) Prothioconazole and (C) Tebuconazole and compositions comprising such combination have very good fungicidal properties and can be used in crop protection for control of *Venturia inequalis* in apples.

The compound combinations comprising (A) Fluopyram, (B) Prothioconazole and (C) Tebuconazole and compositions comprising such combination have very good fungicidal properties and can be used in crop protection for control of *Venturia inequalis* in pears.

The compound combinations comprising (A) Fluopyram, (B) Prothioconazole and (C) Tebuconazole and compositions comprising such combination have very good fungicidal properties and can be used in crop protection for control of *Alternaria solani* in tomatoes.

The compound combinations comprising (A) Fluopyram, (B) Prothioconazole and (C) Trifloxystrobin and compositions comprising such combination can be used for curative or protective control of phytopathogenic fungi. The invention therefore also relates to curative and protective methods for controlling phytopathogenic fungi by the use of the inventive combinations or compositions, which are applied to the seed, the plant or plant parts, the fruit or the soil in which the plants grow.

Plants

All plants and plant parts can be treated in accordance with the invention. Plants are understood here to mean all plants and plant populations, such as desired and undesired wild plants or crop plants (including naturally occurring crop plants). Crop plants may be plants which can be obtained by conventional breeding and optimization methods or by biotechnological and genetic engineering methods or combinations of these methods, including the transgenic plants and including the plant cultivars which are protectable and non-protectable by plant breeders' rights. Plant parts are understood to mean all parts and organs of plants above and below the ground, such as shoot, leaf, flower and root, examples of which include leaves, needles, stalks, stems, flowers, fruit bodies, fruits and seeds, and also roots, tubers and rhizomes. The plant parts also include harvested material and vegetative and generative propagation material, for example leaves, stems, stalks, flowers, silks, seeds, and fruits.

Plants which can be treated include the following: cotton, flax, grapevine, fruit, vegetables, such as *Rosaceae* sp. (for example pome fruits such as apples and pears, but also stone fruits such as apricots, cherries, almonds and peaches, and soft fruits such as strawberries), *Ribesioidae* sp., *Juglandaceae* sp., *Betulaceae* sp., *Anacardiaceae* sp., *Fagaceae* sp., *Moraceae* sp., *Oleaceae* sp., *Actinidaceae* sp., *Lauraceae* sp., *Musaceae* sp. (for example banana trees and plantations), *Rubiaceae* sp. (for example coffee), *Theaceae* sp., *Sterculiceae* sp., *Rutaceae* sp. (for example lemons, oranges and grapefruit); *Solanaceae* sp. (for example tomatoes), *Liliaceae* sp., *Asteraceae* sp. (for example lettuce), *Umbelliferae* sp., *Cruciferae* sp., *Chenopodiaceae* sp., *Cucurbitaceae* sp. (for example cucumber), *Alliaceae* sp. (for example leek, onion), *Papilionaceae* sp. (for example peas); major crop plants, such as *Gramineae* sp. (for example maize, turf, cereals such as wheat, rye, rice, barley, oats, millet and triticale), *Asteraceae* sp. (for example sunflower), *Brassicaceae* sp. (for example white cabbage, red cabbage, broccoli, cauliflower, Brussels sprouts, pak choi, kohlrabi, radishes, and oilseed rape, mustard, horseradish and cress), *Fabacae* sp. (for example bean, peanuts), *Papilionaceae* sp. (for example soya bean), *Solanaceae* sp. (for example potatoes), *Chenopodiaceae* sp. (for example sugar beet, fodder beet, swiss chard, beetroot); useful plants and ornamental plants for gardens and wooded areas; and genetically modified varieties of each of these plants.

Preferred plants for treating with an active compound combination comprising as compound (A) Fluopyram, as compound (B) Prothioconazole and as compound (C) at least one fungicide selected from the group consisting of Trifloxystrobin and Tebuconazole are barley, chickpea, corn, corn grown for seed, cotton, durum, dry peas, field corn, field peas, flax, millet, lentils, oats, soybean, sugar beets, rye, sweet corn, teosinte, triticale, turf grass wheat, and winter wheat.

Preferred plants for treating with an active compound combination comprising as compound (A) Fluopyram, as compound (B) Prothioconazole and as compound (C) at least one fungicide selected from the group consisting of Trifloxystrobin and Tebuconazole are barley, corn, corn grown for seed, cotton, durum, dry peas, field corn, field peas, millet, lentils, oats, soybean, rye, sweet corn, teosinte, triticale, wheat, and winter wheat.

Preferred plants for treating with an active compound combination comprising as compound (A) Fluopyram, as compound (B) Prothioconazole and as compound (C) at least one fungicide selected from the group consisting of Trifloxystrobin and Tebuconazole are barley, dry peas, field peas, millet, lentils, oats, rye, triticale, wheat, and winter wheat.

Preferred plants for treating with an active compound combination comprising as compound (A) Fluopyram, as compound (B) Prothioconazole and as compound (C) at least one fungicide selected from the group consisting of Trifloxystrobin and Tebuconazole are barley, millet, oats, rye, triticale, wheat, and winter wheat.

Preferred plants for treating with an active compound combination comprising as compound (A) Fluopyram, as compound (B) Prothioconazole and as compound (C) at least one fungicide selected from the group consisting of Trifloxystrobin and Tebuconazole are dry peas, field peas, lentils.

Preferred plants for treating with an active compound combination comprising as compound (A) Fluopyram, as compound (B) Prothioconazole and as compound (C) at least one fungicide selected from the group consisting of Trifloxystrobin and Tebuconazole are corn, corn grown for seed, cotton, field corn, soybean, sweet corn, and teosinte.

Preferred plants for treating with an active compound combination comprising as compound (A) Fluopyram, as compound (B) Prothioconazole and as compound (C) at least one fungicide selected from the group consisting of Trifloxystrobin and Tebuconazole are corn, corn grown for seed, field corn, sweet corn, and teosinte.

Preferred plants for treating with an active compound combination comprising as compound (A) Fluopyram, as compound (B) Prothioconazole and as compound (C) at least one fungicide selected from the group consisting of Trifloxystrobin and Tebuconazole are soybean.

Preferred plants for treating with an active compound combination comprising as compound (A) Fluopyram, as compound (B) Prothioconazole and as compound (C) at least one fungicide selected from the group consisting of Trifloxystrobin and Tebuconazole are barley, chickpea, corn, cotton, dry peas, flax, lentils, soybean, sugar beets, sweet corn, turf grass and wheat.

Even more preferred plants for treating with an active compound combination comprising as compound (A) Fluopyram, as compound (B) Prothioconazole and as compound (C) at least one fungicide selected from the group consisting of Trifloxystrobin and Tebuconazole are corn, cotton, soybean, sweet corn.

Even more preferred plants for treating with an active compound combination comprising as compound (A) Fluopyram, as compound (B) Prothioconazole and as compound (C) Trifloxystrobin are corn, cotton, soybean, sweet corn.

Mostly preferred plants for treating with an active compound combination comprising as compound (A) Fluopyram, as compound (B) Prothioconazole and as compound (C) Trifloxystrobin are corn, soybean, and sweet corn.

Even more preferred plants for treating with an active compound combination comprising as compound (A) Fluopyram, as compound (B) Prothioconazole and as compound (C) Trifloxystrobin are corn, cotton, soybean, sweet corn, and turf grass.

Even more preferred plants for treating with an active compound combination comprising as compound (A) Fluopyram, as compound (B) Prothioconazole and as compound (C) Tebuconazole are barley, chickpea, corn, cotton, dry peas, flax, lentils, soybean, sugar beets, sweet corn and wheat.

Pathogens

Non-limiting examples of pathogens of fungal diseases which can be treated with an active compound combination comprising as compound (A) Fluopyram, as compound (B) Prothioconazole and as compound (C) at least one fungicide selected from the group consisting of Trifloxystrobin and Tebuconazole include:

diseases caused by powdery mildew pathogens, for example *Blumeria* species, for example *Blumeria graminis/Erysiphe graminis*; *Podosphaera* species, for example *Podosphaera leucotricha*; *Sphaerotheca* species, for example *Sphaerotheca fuliginea*; *Uncinula* species, for example *Uncinula necator*;

diseases caused by rust disease pathogens, for example *Gymnosporangium* species, for example *Gymnosporangium sabinae*; *Hemileia* species, for example *Hemileia vastatrix*; *Phakopsora* species, for example *Phakopsora pachyrhizi* or *Phakopsora meibomiae*; *Puccinia* species, for example *Puccinia coronata, Puccinia graminis, Puccinia hordei, Puccinia polysora, Puccinia recondita, Puccinia sorghi, Puccinia striiformis, Puccinia substriata* or *Puccinia triticina*; *Uromyces* species, for example *Uromyces appendiculatus*;

diseases caused by pathogens from the group of the Oomycetes, for example *Albugo* species, for example *Albugo candida*; *Bremia* species, for example *Bremia lactucae*; *Peronospora* species, for example *Peronospora pisi* or *P. brassicae*; *Phytophthora* species, for example *Phytophthora infestans*; *Plasmopara* species, for example *Plasmopara viticola*; *Pseudoperonospora* species, for example *Pseudoperonospora humuli* or *Pseudoperonospora cubensis*; *Pythium* species, for example *Pythium ultimum*;

leaf blotch diseases and leaf wilt diseases caused, for example, by *Alternaria* species, for example *Alternaria solani*; *Cercospora* species, for example *Cercospora beticola*; *Cladiosporium* species, for example *Cladiosporium cucumerinum*; *Cochliobolus* species, for example *Cochliobolus sativus* (conidial form: *Drechslera*, syn: *Helminthosporium*) or *Cochliobolus miyabeanus*; *Colletotrichum* species, for example *Colletotrichum lindemuthanium*; *Cycloconium* species, for example *Cycloconium oleaginum*; *Diaporthe* species, for example *Diaporthe citri*; *Elsinoe* species, for example *Elsinoe fawcettii*; *Gloeosporium* species, for example *Gloeosporium laeticolor*; *Glomerella* species, for example *Glomerella cingulata*; *Guignardia* species, for example *Guignardia bidwelli*; *Leptosphaeria* species, for example *Leptosphaeria maculans*; *Magnaporthe* species, for example *Magnaporthe grisea*; *Microdochium* species, for example *Microdochium nivale*; *Mycosphaerella* species, for example *Mycosphaerella graminicola, Mycosphaerella arachidicola* or *Mycosphaerella fijiensis*; *Phaeosphaeria* species, for example *Phaeosphaeria nodorum*; *Pyrenophora* species, for example *Pyrenophora teres* or *Pyrenophora tritici repentis*; *Ramularia* species, for example *Ramularia collo-cygni* or *Ramularia areola*; *Rhynchosporium* species, for example *Rhynchosporium secalis*; *Septoria* species, for example *Septoria apii, Septoria triticii* or *Septoria lycopersici*; *Stagonospora* species, for example *Stagonospora nodorum*; *Typhula* species, for example *Typhula incarnata*; *Venturia* species, for example *Venturia inaequalis*;

root and stem diseases caused, for example, by *Corticium* species, for example *Corticium graminearum*; *Fusarium* species, for example *Fusarium oxysporum*; *Gaeumannomyces* species, for example *Gaeumannomyces graminis*; *Plasmodiophora* species, for example *Plasmodiophora brassicae*; *Rhizoctonia* species, for example *Rhizoctonia solani*; *Sarocladium* species, for example *Sarocladium oryzae*; *Sclerotium* species, for example *Sclerotium oryzae*; *Tapesia* species, for example *Tapesia acuformis*; *Thielaviopsis* species, for example *Thielaviopsis basicola*;

ear and panicle diseases (including corn cobs) caused, for example, by *Alternaria* species, for example *Alternaria* spp.; *Aspergillus* species, for example *Aspergillus flavus*; *Cladosporium* species, for example *Cladosporium cladosporioides*; *Claviceps* species, for example *Claviceps purpurea*; *Fusarium* species, for example *Fusarium culmorum*; *Gibberella* species, for example *Gibberella zeae*; *Monographella* species, for example *Monographella nivalis*; *Stagnospora* species, for example *Stagnospora nodorum*;

diseases caused by smut fungi, for example *Sphacelotheca* species, for example *Sphacelotheca reiliana*; *Tilletia* species, for example *Tilletia caries* or *Tilletia controversa*; *Urocystis* species, for example *Urocystis occulta*; *Ustilago* species, for example *Ustilago nuda*;

fruit rot caused, for example, by *Aspergillus* species, for example *Aspergillus flavus*; *Botrytis* species, for example *Botrytis cinerea*; *Penicillium* species, for example *Penicillium expansum* or *Penicillium purpurogenum*; *Rhizopus* species, for example *Rhizopus stolonifer*; *Sclerotinia* species, for example *Sclerotinia sclerotiorum*; *Verticilium* species, for example *Verticilium alboatrum*;

seed- and soil-borne rot and wilt diseases, and also diseases of seedlings, caused, for example, by *Alternaria* species, for example *Alternaria brassicicola*; *Aphanomyces* species, for example *Aphanomyces euteiches*; *Ascochyta* species, for example *Ascochyta lentis*; *Aspergillus* species, for example *Aspergillus flavus*; *Cladosporium* species, for example *Cladosporium herbarum*; *Cochliobolus* species, for example *Cochliobolus sativus* (conidial form: *Drechslera, Bipolaris* Syn: *Helminthosporium*); *Colletotrichum* species, for example *Colletotrichum coccodes*; *Fusarium* species, for example *Fusarium culmorum*; *Gibberella* species, for example *Gibberella zeae*; *Macrophomina* species, for example *Macrophomina phaseolina*; *Microdochium* species, for example *Microdochium nivale*; *Monographella* species, for example *Monographella nivalis*; *Penicillium* species, for example *Penicillium expansum*; *Phoma* species, for example *Phoma lingam*; *Phomopsis* species, for example *Phomopsis sojae*; *Phytophthora* species, for example *Phytophthora cactorum*; *Pyrenophora* species, for example *Pyrenophora graminea*; *Pyricularia* species, for example *Pyricularia oryzae*; *Pythium* species, for example *Pythium ultimum*; *Rhizoctonia* species, for example *Rhizoctonia solani*; *Rhizopus* species, for example *Rhizopus oryzae*; *Sclerotium* species, for example *Sclerotium rolfsii*; *Septoria* species, for example *Septoria nodorum*; *Typhula* species, for example *Typhula incarnata*; *Verticillium* species, for example *Verticillium dahliae*;

cancers, galls and witches' broom caused, for example, by *Nectria* species, for example *Nectria galligena*;

wilt diseases caused, for example, by *Monilinia* species, for example *Monilinia laxa*;

deformations of leaves, flowers and fruits caused, for example, by *Exobasidium* species, for example *Exobasidium vexans*; *Taphrina* species, for example *Taphrina deformans*;

degenerative diseases in woody plants, caused, for example, by *Esca* species, for example *Phaeomoniella chlamydospora, Phaeoacremonium aleophilum* or *Fomitiporia mediterranea*; *Ganoderma* species, for example *Ganoderma boninense*;

diseases of flowers and seeds caused, for example, by *Botrytis* species, for example *Botrytis cinerea*;

diseases of plant tubers caused, for example, by *Rhizoctonia* species, for example *Rhizoctonia solani*; *Helminthosporium* species, for example *Helminthosporium solani*;

diseases caused by bacterial pathogens, for example *Xanthomonas* species, for example *Xanthomonas campestris* pv. *oryzae*; *Pseudomonas* species, for example *Pseudomonas syringae* pv. *lachrymans*; *Erwinia* species, for example *Erwinia amylovora*.

Preference is given to controlling the following diseases of soya beans:

Fungal diseases on leaves, stems, pods and seeds caused, for example, by *Alternaria* leaf spot (*Alternaria* spec. *atrans tenuissima*), Anthracnose (*Colletotrichum gloeosporoides dematium* var. *truncatum*), brown spot (*Septoria glycines*), cercospora leaf spot and blight (*Cercospora kikuchii*), *Choanephora* leaf blight (*Choanephora infundibulifera trispora* (Syn.)), *Dactuliophora* leaf spot (*Dactuliophora glycines*), downy mildew (*Peronospora manshurica*), *Drechslera* blight (*Drechslera glycini*), frogeye leaf spot (*Cercospora sojina*), *Leptosphaerulina* leaf spot (*Leptosphaerulina trifolii*), *Phyllostica* leaf spot (*Phyllosticta sojaecola*), pod and stem blight (*Phomopsis sojae*), *Phomopsis longicolla*, powdery mildew (*Microsphaera diffusa*), *Pyrenochaeta* leaf spot (*Pyrenochaeta glycines*), *Rhizoctonia* aerial, foliage, and web blight (*Rhizoctonia solani*), rust (*Phakopsora pachyrhizi, Phakopsora meibomiae*), scab (*Sphaceloma glycines*), *Stemphylium* leaf blight (*Stemphylium botryosum*), target spot (*Corynespora cassiicola*).

Fungal diseases on roots and the stem base caused, for example, by black root rot (*Calonectria crotalariae*), charcoal rot (*Macrophomina phaseolina*), *Fusarium* blight or wilt, root rot, and pod and collar rot (*Fusarium oxysporum, Fusarium orthoceras, Fusarium semitectum, Fusarium equiseti*), *Mycoleptodiscus* root rot (*Mycoleptodiscus terrestris*), *Neocosmospora* (*Neocosmospora vasinfecta*), pod and stem blight (*Diaporthe phaseolorum*), stem canker (*Diaporthe phaseolorum* var. *caulivora*), *Phytophthora* rot (*Phytophthora megasperma*), brown stem rot (*Phialophora gregata*), *Pythium* rot (*Pythium aphanidermatum, Pythium irregulare, Pythium debaryanum, Pythium myriotylum, Pythium ultimum*), *Rhizoctonia* root rot, stem decay, and damping-off (*Rhizoctonia solani*), *Sclerotinia* stem decay (*Sclerotinia sclerotiorum*), *Sclerotinia* southern blight (*Sclerotinia rolfsii*), *Thielaviopsis* root rot (*Thielaviopsis basicola*).

Preference is further given to controlling leaf blotch diseases and leaf wilt diseases as well as root and stem diseases of fruits and vegetables.

Preferred pathogens of fungal diseases which can be treated with an active compound combination comprising as compound (A) Fluopyram, as compound (B) Prothioconazole and as compound (C) at least one fungicide selected from the group consisting of Trifloxystrobin and Tebuconazole are selected rom the group comprising of:

Glume Blotch (*Stagonospora nodorum*), Leaf Blotch (*Stagonospora avenae*), Net Blotch (*Pyrenophora teres*), Powdery Mildew (*Blumeria graminis*), Rusts (*Puccinia* spp.), Scald (*Rhynchosporium secalis*), Spot Blotch (*Cochliobolus sativus*) in barley;

Anthracnose (*Colletotrichum truncatum*), Ascochyta blight (*Ascochyta rabiei*), Grey Mold (*Botrytis cinerea*), White mold (*Sclerotinia sclerotiorum*) in chickpea;

Anthracnose Leaf Blight (*Colletotrichum graminicola*), Eyespot (*Aureobasidium zeae*), Gray Leaf Spot (*Cercospora zeae-maydis*), Anthracnose Leaf Blight (*Colletotrichum graminicola*), Eyespot (*Aureobasidium zeae*), Gray Leaf Spot (*Cercospora zeae-maydis*), Northern Corn Leaf Blight (*Setosphaeria turcica*), Northern Corn Leaf Spot (*Cochliobolus carbonum*), Rust (*Puccinia* spp.), Physoderma Brown Spot (*Physoderma maydis*), Southern Corn Leaf Blight (*Cochliobolus heterostrophus*), Tar spot (*Phyllachora maydis*) in corn (Field Corn, Field Corn Grown for Seed and Popcorn);

Rust (*Puccinia* spp.), Target Spot (*Corynespora cassiicola*) in cotton;

*Ascochyta* leaf and pod spot (*Ascochyta pisi*), *Mycosphaerella* blight (*Mycosphaerella pinodes*) in dry peas;

Pasmo (*Septoria linicola*), Sclerotinia stem rot, or white mold (*Sclerotinia sclerotiorum*) in flax;

Anthracnose (*Colletotrichum truncatum*), Ascochyta blight (*Ascochyta rabiei*), Grey Mold (*Botrytis cinerea*), White mold (*Sclerotinia sclerotiorum*) in lentils;

*Alternaria* Leaf Spot (*Alternaria* spp.), Anthracnose (*Colletotrichum truncatum*), Asian Soybean Rust (*Phakopsora pachyrhizi*), Brown Spot (*Septoria glycines*), *Cercospora* Blight (*Cercospora kikuchii*), Frogeye Leaf Spot (*Cercospora sojina*), Pod & Stem Blight (*Diaporthe phaseolorum*), Powdery Mildew (*Microsphaera diffusa*), Rhizoctonia Aerial Blight (*Rhizoctonia solani*), Sclerotinia Stem Rot also known as White Mold (*Sclerotinia sclerotiorum*) in soybean;

*Cercospora* Leaf Spot (*Cercospora beticola*), Powdery Mildew (*Erysiphe polygoni*), Rhizoctonia Stem Canker, Crown Rot (*Rhizoctonia solani*) in sugar beets;

Anthracnose Leaf Blight (*Colletotrichum graminicola*), Eye Spot (*Aureobasidium zeae*), Gray Leaf Spot (*Cercospora zeae-maydis*), Northern Corn Leaf Blight (*Setosphaeria turcica*), Northern Corn Leaf Spot (*Cochliobolus carbonum*), Rusts (*Puccinia* spp.), Southern Corn Leaf Blight (*Cochliobolus heterostrophus*), Tar spot (*Phyllachora maydis*) in sweet corn;

Powdery Mildew (*Blumeria graminis* f. sp. *tritici*), Rusts (*Puccinia* spp.), Septoria Blotch (*Septoria tritici*), Stagonospora Blotch (*Stagonospora nodorum*), Tan Spot (*Pyrenophora tritici-repentis*) in wheat.

Plant Growth Regulation

In some cases, the active compound combinations comprising as compound (A) Fluopyram, as compound (B) Prothioconazole and as compound (C) at least one fungicide selected from the group consisting of Trifloxystrobin and Tebuconazole and composition comprising such combination can, at particular concentrations or application rates, also be used as growth regulators or agents to improve plant properties.

Plant growth regulators may exert various effects on plants. The effect of the substances depends essentially on the time of application in relation to the developmental stage of the plant, and also on the amounts of active ingredient applied to the plants or their environment and on the type of application. In each case, growth regulators should have a particular desired effect on the crop plants.

Growth regulating effects, comprise earlier germination, better emergence, more developed root system and/or improved root growth, increased ability of tillering, more productive tillers, earlier flowering, increased plant height and/or biomass, shorting of stems, improvements in shoot growth, number of kernels/ear, number of ears/m$^2$, number of stolons and/or number of flowers, enhanced harvest index, bigger leaves, less dead basal leaves, improved phyllotaxy, earlier maturation/earlier fruit finish, homogenous riping, increased duration of grain filling, better fruit finish, bigger fruit/vegetable size, sprouting resistance and reduced lodging.

Increased or improved yield is referring to total biomass per hectare, yield per hectare, kernel/fruit weight, seed size and/or hectolitre weight as well as to improved product quality, comprising:

improved processability relating to size distribution (for example of the kernel or fruit), homogenous riping, grain moisture, better milling, better vinification, better brewing, increased juice yield, harvestability, digestibility, sedimentation value, falling number, pod stability, storage stability, improved fiber length/strength/uniformity, increase of milk and/or meet quality of silage fed animals, adaption to cooking and frying;

further comprising improved marketability relating to improved fruit/grain quality, size distribution (for example of the kernel or fruit), increased storage/shelf-life, firmness/softness, taste (aroma, texture), grade (size, shape, number of berries), number of berries/fruits per bunch, crispness, freshness, coverage with wax, frequency of physiological disorders, colour;

further comprising increased desired ingredients such as e.g., protein content, fatty acids, oil content, oil quality, aminoacid composition, sugar content, acid content (pH), sugar/acid ratio (Brix), polyphenols, starch content, nutritional quality, gluten content/index, energy content, taste;

and further comprising decreased undesired ingredients such as e.g., less mycotoxines, less aflatoxines, geosmin level, phenolic aromas, lacchase, polyphenol oxidases and peroxidases, nitrate content.

Plant growth-regulating compounds can be used, for example, to slow down the vegetative growth of the plants. Such growth depression is of economic interest, for example, in the case of grasses, since it is thus possible to reduce the frequency of grass cutting in ornamental gardens, parks and sport facilities, on roadsides, at airports or in fruit crops. Also of significance is the inhibition of the growth of herbaceous and woody plants on roadsides and in the vicinity of pipelines or overhead cables, or quite generally in areas where vigorous plant growth is unwanted.

Also important is the use of growth regulators for inhibition of the longitudinal growth of cereal. This reduces or completely eliminates the risk of lodging of the plants prior to harvest. In addition, growth regulators in the case of cereals can strengthen the culm, which also counteracts lodging. The employment of growth regulators for shortening and strengthening culms allows the deployment of higher fertilizer volumes to increase the yield, without any risk of lodging of the cereal crop.

In many crop plants, vegetative growth depression allows denser planting, and it is thus possible to achieve higher yields based on the soil surface. Another advantage of the smaller plants obtained in this way is that the crop is easier to cultivate and harvest.

Reduction of the vegetative plant growth may also lead to increased or improved yields because the nutrients and assimilates are of more benefit to flower and fruit formation than to the vegetative parts of the plants.

Alternatively, growth regulators can also be used to promote vegetative growth. This is of great benefit when harvesting the vegetative plant parts. However, promoting vegetative growth may also promote generative growth in that more assimilates are formed, resulting in more or larger fruits.

Furthermore, beneficial effects on growth or yield can be achieved through improved nutrient use efficiency, especially nitrogen (N)-use efficiency, phosphorus (P)-use efficiency, water use efficiency, improved transpiration, respiration and/or $CO_2$ assimilation rate, better nodulation, improved Ca-metabolism.

Likewise, growth regulators can be used to alter the composition of the plants, which in turn may result in an improvement in quality of the harvested products. Under the influence of growth regulators, parthenocarpic fruits may be formed. In addition, it is possible to influence the sex of the flowers. It is also possible to produce sterile pollen, which is of great importance in the breeding and production of hybrid seed.

Use of growth regulators can control the branching of the plants. On the one hand, by breaking apical dominance, it is possible to promote the development of side shoots, which may be highly desirable particularly in the cultivation of ornamental plants, also in combination with an inhibition of growth. On the other hand, however, it is also possible to inhibit the growth of the side shoots. This effect is of particular interest, for example, in the cultivation of tobacco or in the cultivation of tomatoes.

Under the influence of growth regulators, the amount of leaves on the plants can be controlled such that defoliation of the plants is achieved at a desired time. Such defoliation plays a major role in the mechanical harvesting of cotton, but is also of interest for facilitating harvesting in other crops, for example in viticulture. Defoliation of the plants can also be undertaken to lower the transpiration of the plants before they are transplanted.

Furthermore, growth regulators can modulate plant senescence, which may result in prolonged green leaf area duration, a longer grain filling phase, improved yield quality.

Growth regulators can likewise be used to regulate fruit dehiscence. On the one hand, it is possible to prevent premature fruit dehiscence. On the other hand, it is also possible to promote fruit dehiscence or even flower abortion to achieve a desired mass ("thinning"). In addition it is possible to use growth regulators at the time of harvest to reduce the forces required to detach the fruits, in order to allow mechanical harvesting or to facilitate manual harvesting.

Growth regulators can also be used to achieve faster or else delayed ripening of the harvested material before or after harvest. This is particularly advantageous as it allows optimal adjustment to the requirements of the market. Moreover, growth regulators in some cases can improve the fruit colour. In addition, growth regulators can also be used to synchronize maturation within a certain period of time. This establishes the prerequisites for complete mechanical or manual harvesting in a single operation, for example in the case of tobacco, tomatoes or coffee.

By using growth regulators, it is additionally possible to influence the resting of seed or buds of the plants, such that plants such as pineapple or ornamental plants in nurseries, for example, germinate, sprout or flower at a time when they are normally not inclined to do so. In areas where there is a risk of frost, it may be desirable to delay budding or germination of seeds with the aid of growth regulators, in order to avoid damage resulting from late frosts.

Finally, growth regulators can induce resistance of the plants to frost, drought or high salinity of the soil. This allows the cultivation of plants in regions which are normally unsuitable for this purpose.

In one embodiment the active compound combinations comprising as compound (A) Fluopyram, as compound (B) Prothioconazole and as compound (C) at least one fungicide selected from the group consisting of Trifloxystrobin and Tebuconazole may increase the yield of the treated plant compared to the yield obtained from an untreated plant.

In one embodiment the active compound combinations comprising as compound (A) Fluopyram, as compound (B) Prothioconazole and as compound (C) Tebuconazole may increase the yield of the treated plant compared to the yield obtained from an untreated plant.

In one embodiment the active compound combinations comprising as compound (A) Fluopyram, as compound (B) Prothioconazole and as compound (C) Trifloxystrobin may increase the yield of the treated plant compared to the yield obtained from an untreated plant.

Resistance Induction/Plant Health and Other Effects

The active compound combinations comprising as compound (A) Fluopyram, as compound (B) Prothioconazole and as compound (C) at least one fungicide selected from the group consisting of Trifloxystrobin and Tebuconazole and compositions comprising such combination may also exhibit a potent strengthening effect in plants. Accordingly, they can be used for mobilizing the defences of the plant against attack by phytopathogenic fungi.

Plant-strengthening (resistance-inducing) substances in the present context are substances capable of stimulating the defence system of plants in such a way that the treated plants, when subsequently inoculated with phytopathogenic fungi, develop a high degree of resistance to these fungi.

Further, in context with the present invention plant physiology effects comprise the following:

Abiotic stress tolerance, comprising tolerance to high or low temperatures, drought tolerance and recovery after drought stress, water use efficiency (correlating to reduced water consumption), flood tolerance, ozone stress and UV tolerance, tolerance towards chemicals like heavy metals, salts, pesticides.

Biotic stress tolerance, comprising increased fungal resistance and increased resistance against nematodes, viruses and bacteria. In context with the present invention, biotic stress tolerance preferably comprises increased fungal resistance and increased resistance against nematodes.

Increased plant vigor, comprising plant health/plant quality and seed vigor, reduced stand failure, improved appearance, increased recovery after periods of stress, improved pigmentation (e.g., chlorophyll content, stay-green effects) and improved photosynthetic efficiency.

Mycotoxins

In addition, the active compound combinations comprising as compound (A) Fluopyram, as compound (B) Prothioconazole and as compound (C) at least one fungicide selected from the group consisting of Trifloxystrobin and Tebuconazole and compositions comprising such combination can reduce the mycotoxin content in the harvested material and the foods and feeds prepared therefrom. Mycotoxins include particularly, but not exclusively, the following: deoxynivalenol (DON), nivalenol, 15-Ac-DON, 3-Ac-DON, T2- and HT2-toxin, fumonisins, zearalenon, moniliformin, fusarin, diaceotoxyscirpenol (DAS), beauvericin, enniatin, fusaroproliferin, fusarenol, ochratoxins, patulin, ergot alkaloids and aflatoxins which can be produced, for example, by the following fungi: *Fusarium* spec., such as *F. acuminatum, F. asiaticum, F. avenaceum, F. crookwellense, F. culmorum, F. graminearum* (*Gibberella zeae*), *F. equiseti, F. fujikoroi, F. musarum, F. oxysporum, F. proliferatum, F. poae, F. pseudograminearum, F. sambucinum, F. scirpi, F. semitectum, F. solani, F. sporotrichoides, F. langsethiae, F. subglutinans, F. tricinctum, F. verticillioides*, and also by *Aspergillus* spec., such as *A. flavus, A. parasiticus, A. nomius, A. ochraceus, A. clavatus, A. terreus, A. versicolor, Penicillium* spec., such as *P. verrucosum, P. viridicatum, P. citrinum, P. expansum, P. claviforme, P. roqueforti, Claviceps* spec., such as *C. purpurea, C. fusiformis, C. paspali, C. africana, Stachybotrys* spec. and others.

In one embodiment the active compound combinations comprising as compound (A) Fluopyram, as compound (B) Prothioconazole and as compound (C) at least one fungicide selected from the group consisting of Trifloxystrobin and Tebuconazole may reduce the mycotoxin content in the harvested grain of the treated plant and the foods and feeds prepared therefrom compared to the mycotoxin content in the harvested grain of the treated plant and the foods and feeds obtained from an untreated plant.

In one embodiment the active compound combinations comprising as compound (A) Fluopyram, as compound (B) Prothioconazole and as compound (C) Tebuconazole may reduce the mycotoxin content in the harvested grain of the treated plant and the foods and feeds prepared therefrom compared to the mycotoxin content in the harvested grain of the treated plant and the foods and feeds obtained from an untreated plant.

In one embodiment the active compound combinations comprising as compound (A) Fluopyram, as compound (B) Prothioconazole and as compound (C) Trifloxystrobin may reduce the mycotoxin content in the harvested grain of the treated plant and the foods and feeds prepared therefrom compared to the mycotoxin content in the harvested grain of the treated plant and the foods and feeds obtained from an untreated plant.

In one embodiment the active compound combinations comprising as compound (A) Fluopyram, as compound (B) Prothioconazole and as compound (C) at least one fungicide selected from the group consisting of Trifloxystrobin and Tebuconazole may reduce the aflatoxin content in the harvested grain of the treated corn plant and the foods and feeds prepared therefrom compared to the aflatoxin content in the harvested grain of the treated corn plant and the foods and feeds obtained from an untreated corn plant.

In one embodiment the active compound combinations comprising as compound (A) Fluopyram, as compound (B) Prothioconazole and as compound (C) Tebuconazole may reduce the aflatoxin content in the harvested grain of the treated corn plant and the foods and feeds prepared therefrom compared to the aflatoxin content in the harvested grain of the treated corn plant and the foods and feeds obtained from an untreated corn plant.

In one embodiment the active compound combinations comprising as compound (A) Fluopyram, as compound (B) Prothioconazole and as compound (C) Tebuconazole may reduce the mycotoxin content in the harvested grain of the treated wheat plant and the foods and feeds prepared therefrom compared to the mycotoxin content in the harvested grain of the treated wheat plant and the foods and feeds obtained from an untreated wheat plant. Preferred mycotoxins whose content may be reduce are selected from thr group comprising of deoxynivalenol (DON), nivalenol, 15-Ac-DON, 3-Ac-DON.

In one embodiment the active compound combinations comprising as compound (A) Fluopyram, as compound (B) Prothioconazole and as compound (C) Tebuconazole may reduce the mycotoxin content in the harvested grain of the treated barley plant and the foods and feeds prepared therefrom compared to the mycotoxin content in the harvested grain of the treated barley plant and the foods and feeds obtained from an untreated barley plant. Preferred mycotoxins whose content may be reduce are selected from the group comprising of deoxynivalenol (DON), nivalenol, 15-Ac-DON, 3-Ac-DON.

In one embodiment the active compound combinations comprising as compound (A) Fluopyram, as compound (B) Prothioconazole and as compound (C) Trifloxystrobin may reduce the aflatoxin content in the harvested grain of the treated corn plant and the foods and feeds prepared therefrom compared to the aflatoxin content in the harvested grain of the treated corn plant and the foods and feeds obtained from an corn untreated plant.

GMO

As already mentioned above, it is possible to treat all plants and their parts in accordance with the invention. In a preferred embodiment, wild plant species and plant cultivars, or those obtained by conventional biological breeding methods, such as crossing or protoplast fusion, and also parts thereof, are treated. In a further preferred embodiment, transgenic plants and plant cultivars obtained by genetic engineering methods, if appropriate in combination with conventional methods (Genetically Modified Organisms), and parts thereof are treated. The terms "parts" or "parts of plants" or "plant parts" have been explained above. More preferably, plants of the plant cultivars which are commercially available or are in use are treated in accordance with the invention. Plant cultivars are understood to mean plants which have new properties ("traits") and have been obtained by conventional breeding, by mutagenesis or by recombinant DNA techniques. They can be cultivars, varieties, bio- or genotypes.

The method of treatment according to the invention can be used in the treatment of genetically modified organisms (GMOs), e.g., plants or seeds. Genetically modified plants (or transgenic plants) are plants of which a heterologous gene has been stably integrated into genome. The expression "heterologous gene" essentially means a gene which is provided or assembled outside the plant and when introduced in the nuclear, chloroplastic or mitochondrial genome gives the transformed plant new or improved agronomic or other properties by expressing a protein or polypeptide of interest or by downregulating or silencing other gene(s) which are present in the plant (using for example, antisense technology, cosuppression technology, RNA interference—RNAi-technology or microRNA—miRNA-technology). A heterologous gene that is located in the genome is also called a transgene. A transgene that is defined by its particular location in the plant genome is called a transformation or transgenic event.

Plants and plant cultivars which are preferably to be treated according to the invention include all plants which have genetic material which impart particularly advantageous, useful traits to these plants (whether obtained by breeding and/or biotechnological means).

Plants and plant cultivars which are also preferably to be treated according to the invention are resistant against one or more biotic stresses, i.e., said plants show a better defense against animal and microbial pests, such as against nematodes, insects, mites, phytopathogenic fungi, bacteria, viruses and/or viroids.

Plants and plant cultivars which may also be treated according to the invention are those plants which are resistant to one or more abiotic stresses. Abiotic stress conditions may include, for example, drought, cold temperature exposure, heat exposure, osmotic stress, flooding, increased soil salinity, increased mineral exposure, ozone exposure, high light exposure, limited availability of nitrogen nutrients, limited availability of phosphorus nutrients, shade avoidance.

Plants and plant cultivars which may also be treated according to the invention, are those plants characterized by enhanced yield characteristics. Increased yield in said plants can be the result of, for example, improved plant physiology, growth and development, such as water use efficiency, water retention efficiency, improved nitrogen use, enhanced carbon assimilation, improved photosynthesis, increased germination efficiency and accelerated maturation. Yield can furthermore be affected by improved plant architecture (under stress and non-stress conditions), including but not limited to, early flowering, flowering control for hybrid seed production, seedling vigor, plant size, internode number and distance, root growth, seed size, fruit size, pod size, pod or ear number, seed number per pod or ear, seed mass, enhanced seed filling, reduced seed dispersal, reduced pod dehiscence and lodging resistance. Further yield traits include seed composition, such as carbohydrate content and composition for example cotton or starch, protein content, oil content and composition, nutritional value, reduction in anti-nutritional compounds, improved processability and better storage stability.

Plants that may be treated according to the invention are hybrid plants that already express the characteristic of heterosis or hybrid vigor which results in generally higher yield, vigor, health and resistance towards biotic and abiotic stresses).

Plants or plant cultivars (obtained by plant biotechnology methods such as genetic engineering) which may be treated according to the invention are herbicide-tolerant plants, i.e., plants made tolerant to one or more given herbicides. Such plants can be obtained either by genetic transformation, or by selection of plants containing a mutation imparting such herbicide tolerance.

Plants or plant cultivars (obtained by plant biotechnology methods such as genetic engineering) which may also be treated according to the invention are insect-resistant transgenic plants, i.e., plants made resistant to attack by certain target insects. Such plants can be obtained by genetic transformation, or by selection of plants containing a mutation imparting such insect resistance.

Plants or plant cultivars (obtained by plant biotechnology methods such as genetic engineering) which may also be treated according to the invention are tolerant to abiotic stresses. Such plants can be obtained by genetic transformation, or by selection of plants containing a mutation imparting such stress resistance.

Plants or plant cultivars (obtained by plant biotechnology methods such as genetic engineering) which may also be treated according to the invention show altered quantity, quality and/or storage-stability of the harvested product and/or altered properties of specific ingredients of the harvested product.

Plants or plant cultivars (that can be obtained by plant biotechnology methods such as genetic engineering) which may also be treated according to the invention are plants, such as cotton plants, with altered fiber characteristics. Such plants can be obtained by genetic transformation, or by selection of plants contain a mutation imparting such altered fiber characteristics.

Plants or plant cultivars (that can be obtained by plant biotechnology methods such as genetic engineering) which may also be treated according to the invention are plants, such as oilseed rape or related *Brassica* plants, with altered oil profile characteristics. Such plants can be obtained by genetic transformation, or by selection of plants contain a mutation imparting such altered oil profile characteristics.

Plants or plant cultivars (that can be obtained by plant biotechnology methods such as genetic engineering) which may also be treated according to the invention are plants, such as oilseed rape or related *Brassica* plants, with altered seed shattering characteristics. Such plants can be obtained by genetic transformation, or by selection of plants contain a mutation imparting such altered seed shattering characteristics and include plants such as oilseed rape plants with delayed or reduced seed shattering.

Plants or plant cultivars (that can be obtained by plant biotechnology methods such as genetic engineering) which may also be treated according to the invention are plants, such as Tobacco plants, with altered post-translational protein modification patterns.

Particularly useful transgenic plants which may be treated according to the invention are plants which comprise one or more genes which encode one or more toxins, such as the following which are sold under the trade names YIELD GARD® (for example maize, cotton, soya beans), KNOCKOUT® (for example maize), BITEGARD® (for example maize), BT-XTRA® (for example maize), STARLINK® (for example maize), BOLLGARD® (cotton), NUCOTN® (cotton), NUCOTN® 33B (cotton), NATUREGARD® (for example maize), PROTECTA® and NEWLEAF® (potato). Examples of herbicide-tolerant plants which may be mentioned are maize varieties, cotton varieties and soya bean varieties which are sold under the trade names ROUNDUP READY® (tolerance to glyphosate, for example maize, cotton, soya bean), LIBERTY LINK® (tolerance to phosphinotricin, for example oilseed rape), IMI® (tolerance to imidazolinones) and STS® (tolerance to sulphonylureas, for example maize). Herbicide-resistant plants (plants bred in a conventional manner for herbicide tolerance) which may be mentioned include the varieties sold un-der the name CLEARFIELD® (for example maize).

Particularly useful transgenic plants which may be treated according with the active compound combinations comprising as compound (A) Fluopyram, as compound (B) Prothioconazole and as compound (C) at least one fungicide selected from the group consisting of Trifloxystrobin and Tebuconazole and compositions comprising such combination are plants containing transformation events, or a combination of transformation events, and that are listed for example in the databases for various national or regional regulatory agencies including Event 1143-14A (cotton, insect control, not deposited, described in WO 2006/128569); Event 1143-51B (cotton, insect control, not deposited, described in WO 2006/128570); Event 1445 (cotton, herbicide tolerance, not de-posited, described in U.S. Patent Application Publication No. 2002/120964 or WO 2002/034946); Event 17053 (rice, herbicide tolerance, deposited as PTA-9843, described in WO 2010/117737); Event 17314 (rice, herbicide tolerance, deposited as PTA-9844, described in WO 2010/117735); Event 281-24-236 (cotton, insect control—herbicide tolerance, deposited as PTA-6233, described in WO 2005/103266 or U.S. Patent Application Publication No. 2005/216969); Event 3006-210-23 (cotton, insect control—herbicide tolerance, deposited as PTA-6233, described in U.S. Patent Application Publication No. 2007/143876 or WO 2005/103266); Event 3272 (corn, quality trait, deposited as PTA-9972, described in WO 2006/098952 or U.S. Patent Application Publication No. 2006/230473); Event 40416 (corn, insect control—herbicide tolerance, deposited as ATCC PTA-11508, described in WO 2011/075593); Event 43A47 (corn, insect control—herbicide tolerance, deposited as ATCC PTA-11509, described in WO 2011/075595); Event 5307 (corn, insect control, deposited as ATCC PTA-9561, described in WO2010/077816); Event ASR-368 (bent grass, herbicide tolerance, deposited as ATCC PTA-4816, described in U.S. Patent Application Publication No. 2006/162007 or WO 2004/053062); Event B16 (corn, herbicide tolerance, not deposited, described in U.S. Patent Application Publication No. 2003/126634); Event BPS-CV127-9 (soybean, herbicide tolerance, deposited as NCIMB No. 41603, described in WO 2010/080829); Event CE43-67B (cotton, insect control, deposited as DSM ACC2724, described in U.S. Patent Application Publication No. 2009/217423 or WO 2006/128573); Event CE44-69D (cotton, insect control, not deposited, described in U.S. Patent Application Publication No. 2010/0024077); Event CE44-69D (cotton, insect control, not deposited, described in WO 2006/128571); Event CE46-02A (cotton, insect control, not deposited, described in WO 2006/128572); Event COT102 (cotton, insect control, not deposited, described in U.S. Patent Application Publication No. 2006/130175 or WO 2004/039986); Event COT202 (cotton, insect control, not deposited, described in U.S. Patent Application Publication No. 2007/067868 or WO 2005/054479); Event COT203 (cotton, insect control, not deposited, described in WO 2005/054480); Event DAS40278 (corn, herbicide tolerance, deposited as ATCC PTA-10244, de-scribed in WO 2011/022469); Event DAS-59122-7 (corn, insect control—herbicide tolerance, deposited as ATCC PTA 11384, described in U.S. Patent Application Publication No. 2006/070139); Event DAS-59132 (corn, insect control—herbicide tolerance, not deposited, described in WO 2009/100188); Event DAS68416 (soybean, herbicide tolerance, deposited as ATCC PTA-10442, described in WO 2011/066384 or WO 2011/066360); Event DP-098140-6 (corn, herbicide tolerance, deposited as ATCC PTA-8296, described in U.S. Patent Application Publication No. 2009/137395 or WO 2008/112019); Event DP-305423-1 (soybean, quality trait, not deposited, described in U.S. Patent Application Publication No. 2008/312082 or WO 2008/054747); Event DP-32138-1 (corn, hybridization system, deposited as ATCC PTA-9158, described in U.S. Patent Application Publication No. 2009/0210970 or WO 2009/103049); Event DP-356043-5 (soybean, herbicide tolerance, deposited as ATCC PTA-8287, described in U.S. Patent Application Publication No. 2010/0184079 or WO 2008/002872); Event EE-1 (brinjal, insect control, not deposited, described in WO 2007/091277); Event F117 (corn, herbicide tolerance, deposited as ATCC 209031, described in US2006059581 or WO 1998/044140); Event GA21 (corn, herbicide tolerance, deposited as ATCC 209033, described in U.S. Patent Application Publication No. 2005/086719 or WO 1998/044140); Event GG25 (corn, herbicide tolerance, deposited as ATCC 209032, described in U.S. Patent Application Publication No. 2005/188434 or WO 1998/044140); Event GHB119 (cotton, insect control—herbicide tolerance, deposited as ATCC PTA-8398, described in WO 2008/151780); Event GHB614 (cotton, herbicide tolerance, deposited as ATCC PTA-6878, described in U.S. Patent Application Publication No. 2010/050282 or WO 2007/017186); Event GJ11 (corn, herbicide tolerance, deposited as ATCC 209030, described in U.S. Patent Application Publication No. 2005/188434 or WO 1998/044140); Event GM RZ13 (sugar beet, virus resistance, deposited as NCIMB-41601, de-scribed in WO 2010/076212); Event H7-1 (sugar beet, herbicide tolerance, deposited as NCIMB 41158 or NCIMB 41159, described in U.S. Patent Application Publication No. 2004/172669 or WO 2004/074492); Event JOPLIN1 (wheat, disease tolerance, not deposited, described in U.S. Patent Application Publication No. 2008/064032); Event LL27 (soybean, herbicide tolerance, deposited as NCIMB41658, described in WO 2006/108674 or U.S. Patent Application Publication No. 2008/320616); Event LL55 (soybean, herbicide tolerance, deposited as NCIMB 41660, described in WO 2006/108675 or U.S. Patent Application Publication No. 2008/196127); Event LLcotton25 (cotton, herbicide tolerance, deposited as ATCC PTA-3343, described in WO 2003/013224 or U.S. Patent Application Publication No. 2003/097687); Event LLRICE06 (rice, herbicide tolerance, deposited as ATCC-23352, described in U.S. Pat. No. 6,468,747 or WO 2000/026345); Event LLRICE601 (rice, herbicide tolerance, deposited as ATCC PTA-2600, described in U.S. Patent Application Publication No. 2008/2289060 or WO 2000/026356); Event LY038 (corn, quality trait, deposited as ATCC PTA-5623, described in U.S. Patent Application Publication No. 2007/028322 or WO 2005/061720); Event MIR162 (corn, insect control, deposited as PTA-8166, described in U.S. Patent Application Publication No. 2009/300784 or WO 2007/142840); Event MIR604 (corn, insect control, not deposited, described in U.S. Patent Application Publication No. 2008/167456 or WO 2005/103301); Event MON15985 (cotton, insect control, deposited as ATCC PTA-2516, described in U.S. Patent Application Publication No. 2004/250317 or WO 2002/100163); Event MON810 (corn, insect control, not deposited, described in U.S. Patent Application Publication No. 2002/102582); Event MON863 (corn, insect control, deposited as ATCC PTA-2605, described in WO 2004/011601 or U.S. Patent Application Publication No. 2006/095986); Event MON87427 (corn, pollination control, deposited as ATCC PTA-7899, described in WO 2011/062904); Event MON87460 (corn, stress tolerance, deposited as ATCC PTA-8910, described in WO 2009/111263 or U.S. Patent Application Publication No. 2011/0138504); Event MON87701 (soybean, in-sect control, deposited as ATCC PTA-8194, described in U.S. Patent Application Publication No. 2009/130071 or WO 2009/064652); Event MON87705 (soybean, quality trait—herbicide tolerance, deposited as ATCC PTA-9241, described in U.S. Patent Application Publication No. 2010/0080887 or WO 2010/037016); Event MON87708 (soybean, herbicide tolerance, deposited as ATCC PTA9670, described in WO 2011/034704); Event MON87754 (soybean, quality trait, deposited as ATCC PTA-9385, described in WO 2010/024976); Event MON87769 (soybean, quality trait, deposited as ATCC PTA-8911, described in U.S. Patent Application Publication No. 2011/0067141 or WO 2009/102873); Event MON88017 (corn, insect control—herbicide tolerance, deposited as ATCC PTA-5582, described in U.S. Patent Application Publication No. 2008/028482 or WO 2005/059103); Event MON88913 (cotton, herbicide tolerance, deposited as ATCC PTA-4854, described in WO 2004/072235 or U.S. Patent Application Publication No. 2006/

059590); Event MON89034 (corn, insect control, deposited as ATCC PTA-7455, described in WO 2007/140256 or U.S. Patent Application Publication No. 2008/260932); Event MON89788 (soybean, herb-icide tolerance, deposited as ATCC PTA-6708, described in U.S. Patent Application Publication No. 2006/282915 or WO 2006/130436); Event MS11 (oilseed rape, pollination control—herbicide tolerance, deposited as ATCC PTA-850 or PTA-2485, described in WO 2001/031042); Event MS8 (oilseed rape, pollination control—herbicide tolerance, deposited as ATCC PTA-730, described in WO 2001/041558 or U.S. Patent Application Publication No. 2003/188347); Event NK603 (corn, herbicide tolerance, deposited as ATCC PTA-2478, described in U.S. Patent Application Publication No. 2007/292854); Event PE-7 (rice, insect control, not deposited, described in WO 2008/114282); Event RF3 (oilseed rape, pollination control—herbicide tolerance, deposited as ATCC PTA-730, described in WO 2001/041558 or U.S. Patent Application Publication No. 2003/188347); Event RT73 (oilseed rape, herbicide tolerance, not deposited, described in WO 2002/036831 or U.S. Patent Application Publication No. 2008/070260); Event T227-1 (sugar beet, herbicide tolerance, not deposited, de-scribed in WO 2002/44407 or U.S. Patent Application Publication No. 2009/265817); Event T25 (corn, herbicide tolerance, not deposited, described in U.S. Patent Application Publication No. 2001/029014 or WO 2001/051654); Event T304-40 (cotton, insect control—herbicide tolerance, deposited as ATCC PTA-8171, described in U.S. Patent Application Publication No. 2010/077501 or WO 2008/122406); Event T342-142 (cotton, insect control, not deposited, described in WO 2006/128568); Event TC1507 (corn, insect control—herbicide tolerance, not deposited, described in U.S. Patent Application Publication No. 2005/039226 or WO 2004/099447); Event VIP1034 (corn, insect control—herbicide tolerance, deposited as ATCC PTA-3925, described in WO 2003/052073), Event 32316 (corn, insect control—herbicide tolerance, deposited as PTA-11507, described in WO 2011/084632); Event 4114 (corn, insect control—herbicide tolerance, deposited as PTA-11506, described in WO 2011/084621).

Preferred plants are selected from the group comprising Event 1143-14A (cotton, insect control, not deposited, described in WO 2006/128569); Event 1143-51B (cotton, insect control, not deposited, described in WO 2006/128570); Event 1445 (cotton, herbicide tolerance, not deposited, described in U.S. Patent Application Publication No. 2002/120964 or WO 2002/034946); Event 281-24-236 (cotton, insect control—herbicide tolerance, deposited as PTA-6233, described in WO 2005/103266 or U.S. Patent Application Publication No. 2005/216969); Event 3006-210-23 (cotton, insect control—herbicide tolerance, deposited as PTA-6233, described in U.S. Patent Application Publication No. 2007/143876 or WO 2005/103266); Event 3272 (corn, quality trait, deposited as PTA-9972, described in WO 2006098952 or U.S. Patent Application Publication No. 2006/230473); Event 40416 (corn, insect control—herbicide tolerance, deposited as ATCC PTA-11508, described in WO 2011/075593); Event 43A47 (corn, insect control—herbicide tolerance, deposited as ATCC PTA-11509, described in WO 2011/075595); Event 5307 (corn, insect control, deposited as ATCC PTA-9561, described in WO 2010/077816); Event B16 (corn, herbicide tolerance, not deposited, described in U.S. Patent Application Publication No. 2003/126634); Event BPS-CV127-9 (soybean, herbicide tolerance, deposited as NCIMB No. 41603, described in WO 2010/080829); Event CE43-67B (cotton, insect control, deposited as DSM ACC2724, described in U.S. Patent Application Publication No. 2009/217423 or WO 2006/128573); Event CE44-69D (cotton, insect control, not deposited, described in U.S. Patent Application Publication No. 2010/0024077); Event CE44-69D (cotton, insect control, not deposited, described in WO 2006/128571); Event CE46-02A (cotton, insect control, not deposited, described in WO 2006/128572); Event COT102 (cotton, insect control, not deposited, described in U.S. Patent Application Publication No. 2006/130175 or WO 2004/039986); Event COT202 (cotton, insect control, not deposited, described in U.S. Patent Application Publication No. 2007/067868 or WO 2005/054479); Event COT203 (cotton, insect control, not deposited, described in WO 2005/054480); Event DAS40278 (corn, herbicide tolerance, deposited as ATCC PTA-10244, de-scribed in WO 2011/022469); Event DAS-59122-7 (corn, insect control—herbicide tolerance, deposited as ATCC PTA 11384, described in U.S. Patent Application Publication No. 2006/070139); Event DAS-59132 (corn, insect control—herbi-cide tolerance, not deposited, described in WO 2009/100188); Event DAS68416 (soybean, herbicide tol-erance, deposited as ATCC PTA-10442, described in WO 2011/066384 or WO 2011/066360); Event DP-098140-6 (corn, herbicide tolerance, deposited as ATCC PTA-8296, described in U.S. Patent Application Publication No. 2009/137395 or WO 2008/112019); Event DP-305423-1 (soybean, quality trait, not deposited, described in U.S. Patent Application Publication No. 2008/312082 or WO 2008/054747); Event DP-32138-1 (corn, hybridization system, deposited as ATCC PTA-9158, described in U.S. Patent Application Publication No. 2009/0210970 or WO 2009/103049); Event DP-356043-5 (soybean, herbicide tolerance, deposited as ATCC PTA-8287, described in U.S. Patent Application Publication No. 2010/0184079 or WO 2008/002872); Event FI117 (corn, herbicide tolerance, deposited as ATCC 209031, described in U.S. Patent Application Publication No. 2006/059581 or WO 1998/044140); Event GA21 (corn, herbicide tolerance, deposited as ATCC 209033, described in U.S. Patent Application Publication No. 2005/086719 or WO 1998/044140); Event GG25 (corn, herbicide tolerance, deposited as ATCC 209032, described in U.S. Patent Application Publication No. 2005/188434 or WO 1998/044140); Event GHB119 (cotton, insect control—herbicide tolerance, deposited as ATCC PTA-8398, described in WO 2008/151780); Event GHB614 (cotton, herbicide toler-ance, deposited as ATCC PTA-6878, described in U.S. Patent Application Publication No. 2010/050282 or WO 2007/017186); Event GJ11 (corn, herbicide tolerance, deposited as ATCC 209030, described in U.S. Patent Application Publication No. 2005/188434 or WO 1998/044140); Event LL27 (soybean, herbicide toler-ance, de-posited as NCIMB41658, described in WO 2006/108674 or U.S. Patent Application Publication No. 2008/320616); Event LL55 (soybean, herbicide tolerance, deposited as NCIMB 41660, described in WO 2006/108675 or U.S. Patent Application Publication No. 2008/196127); Event LY038 (corn, quality trait, deposited as ATCC PTA-5623, described in U.S. Patent Application Publication No. 2007/028322 or WO 2005061720); Event MIR162 (corn, insect control, deposited as PTA-8166, described in U.S. Patent Application Publication No. 2009/300784 or WO 2007/142840); Event MIR604 (corn, insect control, not deposited, described in U.S. Patent Application Publication No. 2008/167456 or WO 2005/103301); Event MON15985 (cotton, insect control, deposited as ATCC PTA-2516, described in U.S. Patent Application Publication No. 2004/250317 or WO 2002/100163); Event MON810 (corn, insect control, not deposited, described in U.S. Patent Application Publication No. 2002/102582); Event MON863 (corn, insect control, deposited as ATCC PTA-2605, described in WO 2004/011601 or U.S. Patent Application Publication No. 2006/095986); Event MON87427 (corn, pollination control, deposited as ATCC PTA-7899, described in WO 2011/062904); Event MON87460 (corn, stress tolerance, deposited as ATCC PTA-8910, described in WO 2009/111263 or U.S. Patent Application Publication No. 2011/0138504); Event MON87701 (soybean, insect control, deposited as ATCC PTA-8194, described in U.S. Patent Application Publication No. 2009/130071 or WO 2009/064652); Event MON87705 (soybean, quality trait—herbicide tolerance, deposited as ATCC PTA-9241, described in U.S. Patent Application Publication No. 2010/0080887 or WO 2010/037016); Event MON87708 (soybean, herbicide tolerance, deposited as ATCC PTA9670, described in WO 2011/034704); Event MON87754 (soybean, quality trait, deposited as ATCC PTA-9385, described in WO 2010/024976); Event MON87769 (soybean, quality trait, deposit-ed as ATCC PTA-8911, described in U.S. Patent Application Publication No. 2011/0067141 or WO 2009/102873); Event MON88017 (corn, insect control—herbicide tolerance, deposited as ATCC PTA-5582, described in U.S. Patent Application Publication No. 2008/028482 or WO 2005/059103); Event MON88913 (cotton, herbicide tolerance, deposited as ATCC PTA-4854, de-scribed in WO 2004/072235 or U.S. Patent Application Publication No. 2006/059590); Event MON89034 (corn, insect control, deposited as ATCC PTA-7455, described in WO 2007/140256 or U.S. Patent Application Publication No. 2008/260932); Event MON89788 (soybean, herbicide tolerance, deposited as ATCC PTA-6708, described in U.S. Patent Application Publication No. 2006/282915 or WO 2006/130436); Event NK603 (corn, herbicide tolerance, deposited as ATCC PTA-2478, described in U.S. Patent Application Publication No. 2007/292854); Event PE-7 (rice, insect control, not deposited, described in WO 2008/114282); Event T25 (corn, herbicide tolerance, not deposited, de-scribed in U.S. Patent Application Publication No. 2001/029014 or WO 2001/051654); Event T304-40 (cotton, insect control—herbicide tolerance, deposited as ATCC PTA-8171, described in U.S. Patent Application Publication No. 2010/077501 or WO 2008/122406); Event T342-142 (cotton, insect control, not deposited, described in WO 2006/128568); Event TC1507 (corn, insect control—herbicide tolerance, not deposited, described in U.S. Patent Application Publication No. 2005/039226 or WO 2004/099447); Event VIP1034 (corn, insect control—herbicide tolerance, deposited as ATCC PTA-3925, described in WO 2003/052073), Event 32316 (corn, insect control—herbicide tolerance, deposited as PTA-11507, de-scribed in WO 2011/084632); Event 4114 (corn, insect control—herbicide tolerance, deposited as PTA-11506, described in WO 2011/084621).

Application

When using the compound combinations comprising (A) Fluopyram, (B) Prothioconazole and (C) Trifloxystrobin and compositions comprising such combination as fungicides, the application rates can be varied in the range as outlined below, depending on the kind of application. The application rate is in the case of treatment of plant parts, for example leaves: from 0.1 to 10,000 g/ha, preferably from 10 to 1000 g/ha (total amount of all active ingredients), more preferably from 50 to 400 g/ha (total amount of all active ingredients), most preferably from 50 to 400 g/ha (total amount of all active ingredients) (in the case of application by watering or dripping, it is even possible to reduce the application rate, especially when inert substrates such as rockwool or perlite are used);

in the case of soil treatment, for example in-furrow: from 0.1 to 10,000 g/ha, preferably from 1 to 5000 g/ha, more preferably from 50 to 400 g/ha (total amount of all active ingredients), most preferably from 50 to 400 g/ha (total amount of all active ingredients), wherein the given amounts refer to the total amount of active ingredient in the respective combination or composition.

When using the compound combinations comprising (A) Fluopyram, (B) Prothioconazole and (C) Trifloxystrobin and compositions comprising such combination as fungicides, the application rates for each active ingredient can be varied in the range as outlined below. The application rate is in the case of treatment of plant parts, for example leaves: from 10 to 200 g/ha, preferably from 50 to 150 g/ha (total amount of Prothioconazole), more preferably from 75 to 110 g/ha (total amount of Prothioconazole), most preferably from 90 to 105 g/ha (total amount of Prothioconazole);

When using the compound combinations comprising (A) Fluopyram, (B) Prothioconazole and (C) Trifloxystrobin and compositions comprising such combination as fungicides, the application rates for each active ingredient can be varied in the range as outlined below. The application rate is in the case of treatment of plant parts, for example leaves: from 10 to 250 g/ha, preferably from 50 to 200 g/ha (total amount of Prothioconazole), more preferably from 75 to 175 g/ha (total amount of Prothioconazole), most preferably from 90 to 175 g/ha (total amount of Prothioconazole);

When using the compound combinations comprising (A) Fluopyram, (B) Prothioconazole and (C) Trifloxystrobin and compositions comprising such combination as fungicides, the application rates for each active ingredient can be varied in the range as outlined below. The application rate is in the case of treatment of plant parts, for example leaves: from 10 to 150 g/ha (total amount of Trifloxystrobin), preferably from 50 to 120 g/ha (total amount of Trifloxystrobin), more preferably from 60 to 100 g/ha (total amount of Trifloxystrobin), most preferably from 80 to 100 g/ha (total amount of Trifloxystrobin);

When using the compound combinations comprising (A) Fluopyram, (B) Prothioconazole and (C) Trifloxystrobin and compositions comprising such combination as fungicides, the application rates for each active ingredient can be varied in the range as outlined below. The application rate is in the case of treatment of plant parts, for example leaves: from 10 to 200 g/ha (total amount of Trifloxystrobin), preferably from 50 to 175 g/ha (total amount of Trifloxystrobin), more preferably from 60 to 150 g/ha (total amount of Trifloxystrobin), most preferably from 80 to 140 g/ha (total amount of Trifloxystrobin);

When using the compound combinations comprising (A) Fluopyram, (B) Prothioconazole and (C) Trifloxystrobin and compositions comprising such combination as fungicides, the application rates for each active ingredient can be varied in the range as outlined below. The application rate is in the case of treatment of plant parts, for example leaves: from 10 to 150 g/ha (total amount of Fluopyram), preferably from 25 to 100 g/ha (total amount of Fluopyram), more preferably from 50 to 100 g/ha (total amount of Fluopyram), most preferably from 60 to 100 g/ha (total amount of Fluopyram);

When using the compound combinations comprising (A) Fluopyram, (B) Prothioconazole and (C) Trifloxystrobin and compositions comprising such combination as fungicides, the application rates for each active ingredient can be varied in the range as outlined below. The application rate is in the case of treatment of plant parts, for example leaves: from 10 to 150 g/ha (total amount of Fluopyram), preferably from 25 to 125 g/ha (total amount of Fluopyram), more preferably from 50 to 100 g/ha (total amount of Fluopyram), most preferably from 50 to 100 g/ha (total amount of Fluopyram);

When using the compound combinations comprising (A) Fluopyram, (B) Prothioconazole and (C) Tebuconazole and compositions comprising such combination as fungicides, the application rates can be varied in the range as outlined below, depending on the kind of application. The application rate is

- in the case of treatment of plant parts, for example leaves: from 0.1 to 10,000 g/ha, preferably from 10 to 1000 g/ha, more preferably from 50 to 400 g/ha (in the case of application by watering or dripping, it is even possible to reduce the application rate, especially when inert substrates such as rockwool or perlite are used);
- in the case of seed treatment: from 0.1 to 200 g per 100 kg of seed, preferably from 1 to 150 g per 100 kg of seed, more preferably from 2.5 to 25 g per 100 kg of seed, even more preferably from 2.5 to 12.5 g per 100 kg of seed;
- in the case of soil treatment, preferably in furrow-treatment: from 0.1 to 10,000 g/ha, preferably from 1 to 5000 g/ha, more preferably from 50 to 400 g/ha, wherein the given amounts refer to the total amount of active ingredient in the respective combination or composition.

In one embodiment the use of compound combinations comprising (A) Fluopyram, (B) Prothioconazole and (C) Trifloxystrobin and compositions comprising such combination is described where such combinations or compositions are applied at the following stages according to the BBCH:

- Stage 51 (Inflorescence Emergence) to stage 79 (end of development of fruit), preferably Stage 55 to 75, more preferably 59 to 71, most preferably 61 to 69.
- Stage 20 (Inflorescence Emergence) to stage 79 (end of development of fruit), preferably Stage 55 to 75, more preferably 59 to 71, most preferably 61 to 69.

In one embodiment the use of compound combinations comprising (A) Fluopyram, (B) Prothioconazole and (C) Trifloxystrobin and compositions comprising such combination is described where such combinations or compositions are applied one or two times per growing season of the respective crop.

In one embodiment the use of compound combinations comprising (A) Fluopyram, (B) Prothioconazole and (C) Tebuconazole and compositions comprising such combination is described where such combinations or compositions are applied at the following stages:

- Stage 51 (Inflorescence Emergence) to stage 79 (end of development of fruit), preferably Stage 55 to 75, more preferably 59 to 71, most preferably 61 to 69.

These application rates are merely by way of example and are not limiting for the purposes of the invention.

The invention is illustrated by the examples below. However, the invention is not limited to the examples.

EXAMPLES

The advanced fungicidal activity of the active compound combinations comprising as compound (A) Fluopyram, as compound (B) Prothioconazole and as compound (C) at least one fungicide selected from the group consisting of Trifloxystrobin and Tebuconazole is evident from the examples below.

Example A: Field Trials with Active Combinations Comprising (A) Fluopyram, (B) Prothioconazole and (C) Trifloxystrobin The field trials in corn were conducted in Indiana, Minnesota, Iowa, North Carolina, and Illinois of the United States in spring/summer 2015.

Fertilization and herbicide applications were carried out according to the local agricultural practice. Each trial was conducted with 4 fully randomized replicates. The plot size was approximately 4 meters by 10 meters.

The following products as shown in Table 1 were sprayed using a backpack sprayer at BBCH—growth stage 63.

Plots were harvested using a small-plot combine.

TABLE 1

| Product Name | Active Ingredients | Concentration [g/L] | Application Rate [g/ha] |
| --- | --- | --- | --- |
| STRATEGO YIELD | Prothioconazole + | 125 | 36.5 |
|  | Trifloxystrobin | 375 | 110 |
| PROPULSE + | Fluopyram + | 200 | 70 |
| GEM | Prothioconazole | 200 | 70 |
|  | Trifloxystrobin | 500 | 70 |
| PROLINE | Prothioconazole | 480 | 200 |
| HEADLINE AMP | Pyraclostrobin | 146 | 105 |
|  | Metconazole | 55 | 40 |

TABLE 2

| Product Name | Yield [bu/acre] |
| --- | --- |
| Untreated | 186 |
| STRATEGO YIELD | 196 |
| Fluopyram + Prothioconazole + Trifloxystrobin | 202 |
| PROLINE | 197 |
| HEADLINE AMP | 198 |

Example B: Field Trials with Active Combinations Comprising (A) Fluopyram, (B) Prothioconazole and (C) Trifloxystrobin The field trials in corn were conducted in Michigan, Ohio, Illinois, Indiana, Iowa, Minnesota, Mississippi, and Florida of the United States in spring/summer 2018.

Fertilization and herbicide were carried out according to the local agricultural practice. Each trial was conducted with 4 fully randomized replicates. The plot size was approximately 4 meters by 10 meters.

The following products as shown in Table 3 were sprayed using a backpack sprayer at BBCH—growth stage 63.

Activity against *Cerospora zeae-maydis* (CERCZM) was calculated according to Abbott (WS Abbott, 1925, J. Econ. Entomol. 18:265-267).

Plots were harvested using a small-plot combine.

TABLE 3

| Product Name | Active Ingredients | Concentration [g/L] | Application Rate [g/ha] |
|---|---|---|---|
| DELARO | Prothioconazole + | 175 | 105 |
| | Trifloxystrobin | 150 | 88 |
| DELARO + | Prothioconazole + | 175 | 105 |
| LUNA PRIVILEGE | Trifloxystrobin | 150 | 88 |
| | Fluopyram | 400 | 75 |
| TRIVIAPRO | Azoxystrobin + | 110 | 110 |
| | Benzovindiflupyr + | 30 | 30 |
| | Propiconazole | 125 | 125 |
| HEADLINE AMP | Pyraclostrobin + | 146 | 105 |
| | Metconazole | 55 | 40 |

TABLE 4

| Product Name | Activity Against CERCZM [% Abbott] |
|---|---|
| DELARO | 58 |
| DELARO + Fluopyram | 72 |
| TRIVIAPRo | 68 |
| HEADLINE AMP | 59 |

Example C: Field Trials with Active Combinations Comprising (A) Fluopyram, (B) Prothioconazole and (C) Trifloxystrobin The field trial in corn was conducted in Florida in spring/summer 2018.

Fertilization and herbicide were carried out according to the local agricultural practice. The trial was conducted with 4 fully randomized replicates. The plot size was approximately 4 meters by 10 meters.

The following products as shown in table 5 were sprayed using a backpack sprayer at BBCH—growth stage 63.

Activity against *Cochiobolus heterostrophus* (COCHHE) was calculated according to Abbott (W S Abbott, 1925, J. Econ. Entomol. 18:265-267).

Activity against *Kabatiella zeae* (KABAZE) was calculated according to Abbott (W S Abbott, 1925, J. Econ. Entomol. 18:265-267).

TABLE 5

| Product Name | Active Ingredients | Concentration [g/L] | Application Rate [g/ha] |
|---|---|---|---|
| DELARO | Prothioconazole + | 175 | 105 |
| | Trifloxystrobin | 150 | 88 |
| DELARO + | Prothioconazole + | 175 | 105 |
| LUNA PRIVILEGE | Trifloxystrobin | 150 | 88 |
| | Fluopyram | 400 | 75 |
| TRIVIAPRO | Azoxystrobin + | 110 | 110 |
| | Benzovindiflupyr + | 30 | 30 |
| | Propiconazole | 125 | 125 |
| HEADLINE AMP | Pyraclostrobin | 146 | 105 |
| | Metconazole | 55 | 40 |

TABLE 6

| Product Name | Activity Against COCHHE [% Abbott] |
|---|---|
| DELARO | 50 |
| DELARO + Fluopyram | 81 |
| TRIVIAPRO | 48 |
| HEADLINE AMP | 32 |

TABLE 7

| Product Name | Activity Against KABAZE [% Abbott] |
|---|---|
| DELARO | 64 |
| DELARO + Fluopyram | 79 |
| TRIVIAPRO | 65 |
| HEADLINE AMP | 57 |

Example D: Field Trials with Active Combinations Comprising (A) Fluopyram, (B) Prothioconazole and (C) Trifloxystrobin The field trials in soybean were conducted in Ohio, Indiana, Minnesota, Iowa, Illinois, Kansas, Mississippi, Florida, Arkansas in spring/summer 2018.

Fertilization and herbicide applications were carried out according to the local agricultural practice. The trial was conducted with twentyfive fully randomized replicates. The plot size was approximately 4 meters by 10 meters.

The following products as shown in Table 8 were sprayed using a backpack sprayer at BBCH—growth stage 69.

Activity against *Cercospora sojina* (CERCSP) was calculated according to Abbott (W S Abbott, 1925, J. Econ. Entomol. 18:265-267).

Activity against *Septoria glycines* (SEPTGL) was calculated according to Abbott (W S Abbott, 1925, J. Econ. Entomol. 18:265-267).

Plots were harvested using a small-plot combine.

TABLE 8

| Product Name | Active Ingredients | Concentration [g/L] | Application Rate [g/ha] |
|---|---|---|---|
| DELARO | Prothioconazole + | 175 | 105 |
| | Trifloxystrobin | 150 | 88 |
| DELARO + | Prothioconazole + | 175 | 105 |
| LUNA PRIVILEGE | Trifloxystrobin | 150 | 88 |
| | Fluopyram | 400 | 75 |
| QUADRIS TOP SBX | Azoxystrobin, + | 225 | 115 |
| | Difenconazole | 225 | 115 |
| PRIAXOR | Fluxapyroxad + | 116.4 | 49 |
| | Pyraclostrobin | 333.3 | 97 |
| TRIVIAPRO | Azoxystrobin + | 110 | 110 |
| | Benzovindiflupyr + | 30 | 30 |
| | Propiconazole | 125 | 125 |

TABLE 9

| Product Name | Yield [bu/ac] |
|---|---|
| Untreated | 60.1 |
| DELARO | 65.3 |
| DELARO + Fluopyram | 67.9 |
| QUADRIS TOP SBX | 69.4 |
| PRIAXOR | 65.2 |
| TRIVIAPRO | 61.7 |
| DELARO | 61.9 |

TABLE 10

| Product Name | Activity Against CERCSP [% Abbott] |
|---|---|
| DELARO | 58 |
| DELARO + Fluopyram | 57 |
| QUADRIS TOP SBX | 52 |
| PRIAXOR | 51 |
| TRIVIAPRO | 55 |

TABLE 11

| Product Name | Activity Against SEPTGL [% Abbott] |
|---|---|
| DELARO | 46 |
| DELARO + Fluopyram | 55 |
| QUADRIS TOP SBX | 48 |
| PRIAXOR | 46 |
| TRIVIAPRO | 61.7 |

Example E: Field Trials with Active Combinations Comprising (A) Fluopyram, (B) Prothioconazole and (C) Trifloxystrobin Field trials in corn were conducted in Ohio, Missouri, Minnesota, Iowa, Illinois, Mississippi, Kansas, and Georgia in spring/summer 2019.

Fertilization and herbicide applications were carried out according to the local agricultural practice. The trial was arranged as a randomized complete block with 4 replications. The plot size was approximately 4 meters by 10 meters.

The following products as shown in Table 12 were sprayed using a backpack sprayer at BBCH—growth stage 63.

Activity against *Cercospora zeae-maydis* (CERCZM) was calculated according to Abbott (W S Abbott, 1925, J. Econ. Entomol. 18:265-267).

Plots were harvested using a small-plot combine.

TABLE 12

| Product Name | Active Ingredients | Concentration [g/L] | Application Rate [g/ha] |
|---|---|---|---|
| DELARO | Prothioconazole + | 175 | 102 |
|  | Trifloxystrobin | 150 | 88 |
| DELARO + | Prothioconazole + | 175 | 103 |
| LUNA PRIVILEGE | Trifloxystrobin | 150 | 90 |
|  | Fluopyram | 400 | 75 |
| TRIVAPRO | Azoxystrobin, + | 110 | 110 |
|  | Benzovindiflupyr + | 30 | 30 |
|  | Propiconazole | 125 | 125 |
| HEADLINE AMP | Pyraclostrobin | 146 | 105 |
|  | Metconazole | 55 | 40 |

TABLE 13

| Product Name | Activity Against CERCZM [% Abbott] |
|---|---|
| DELARO | 57 |
| DELARO + Fluopyram | 67 |
| TRIVIAPRO | 49 |
| HEADLINE AMP | 58 |

Example F: Field Trials with Active Combinations Comprising (A) Fluopyram, (B) Prothioconazole and (C) Trifloxystrobin Field trials in soybean were conducted in Ohio, Missouri, Iowa, Illinois, Mississippi, Arkansas, and Georgia in spring/summer 2019.

Fertilization and herbicide applications were carried out according to the local agricultural practice. The trial was arranged as a randomized complete block with 4 replications. The plot size was approximately 4 meters by 10 meters.

The following products as shown in Table 14 were sprayed using a backpack sprayer at BBCH—growth stage 69.

Activity against *Cercospora sojina* (CERCSP) was calculated according to Abbott (W S Abbott, 1925, J. Econ. Entomol. 18:265-267).

Plots were harvested using a small-plot combine.

TABLE 14

| Product Name | Active Ingredients | Concentration [g/L] | Application Rate [g/ha] |
|---|---|---|---|
| DELARO | Prothioconazole + | 175 | 102 |
|  | Trifloxystrobin | 150 | 88 |
| DELARO + | Prothioconazole + | 175 | 103 |
| LUNA PRIVILEGE | Trifloxystrobin | 150 | 90 |
|  | Fluopyram | 400 | 75 |
| PRIAXOR | Fluxapyroxad + | 116.4 | 49 |
|  | Pyraclostrobin | 333.3 | 97 |

TABLE 15

| Product Name | Activity Against CERCZM [% Abbott] |
|---|---|
| DELARO | 60 |
| DELARO + Fluopyram | 65 |
| PRIAXOR | 55 |

Example G: Greenhouse Trials with Active Combinations Comprising (A) Fluopyram, (B) Prothioconazole and (C) Trifloxystrobin The advanced fungicidal activity of the active compound combinations according to the invention is evident from the example below. While the individual active compounds exhibit weaknesses with regard to the fungicidal activity, the combinations have an activity which exceeds a simple addition of activities.

A synergistic effect of fungicides is always present when the fungicidal activity of the active compound combinations exceeds the total of the activities of the active compounds when applied individually. The expected activity for a given combination of two active compounds can be calculated as follows (cf. Colby, S. R., "Calculating Synergistic and Antagonistic Responses of Herbicide Combinations," *Weeds* 1967, 15, 20-22):

If

X is the efficacy when active compound A is applied at an application rate of m ppm (or g/ha), Y is the efficacy when active compound B is applied at an application rate of n ppm (or g/ha), Z is the efficacy when active compound B is applied at an application rate of r ppm (or g/ha), $E_1$ is the efficacy when the active compounds A and B are applied at application rates of m and n ppm (or g/ha), respectively, and $E_2$ is the efficacy when the active compounds A, B and C are applied at application rates of m, n and r ppm (or g/ha), respectively, and then $$E_1 = X + Y - \frac{X \cdot Y}{100}$$

and for a ternary mixture:

$$E_2 = X + Y + Z - \left(\frac{X \cdot Y + X \cdot Z + Y \cdot Z}{100}\right) + \frac{X \cdot Y \cdot Z}{10000}$$

The degree of efficacy, expressed in % is denoted. 0% means an efficacy which corresponds to that of the control while an efficacy of 100% means that no disease is observed.

If the actual fungicidal activity exceeds the calculated value, then the activity of the combination is superadditive, i.e., a synergistic effect exists. In this case, the efficacy which was actually observed must be greater than the value for the expected efficacy (E) calculated from the abovementioned formula.

A further way of demonstrating a synergistic effect is the method of Tammes (cf. "Isoboles, a graphic representation of synergism in pesticides" in *Neth. J. Plant Path.*, 1964, 70, 73-80).

The invention is illustrated by the following examples. However the invention is not limited to the examples.

Example G1: In Vivo Preventive Test on *Alternaria* Test (Tomatoes)

Solvent: 24.5 parts by weight of acetone
24.5 parts by weight of dimethyl sulfoxide
Emulsifier: 1 part by weight of alkylaryl polyglycol ether To produce a suitable preparation of active compound, 1 part by weight of active compound is mixed with the stated amounts of solvent and emulsifier, and the concentrate is diluted with water to the desired concentration.

To test for preventive activity, young plants are sprayed with the preparation of active compound at the stated rate of application. After the spray coating has dried on, the plants are inoculated with an aqueous spore suspension of *Alternaria solani*. The plants are then placed in an incubation cabinet at approximately 20° C. and a relative atmospheric humidity of 100%.

The test is evaluated 3 days after the inoculation. 0% means an efficacy which corresponds to that of the untreated control while an efficacy of 100% means that no disease is observed.

The table below clearly shows that the observed activity of the active compound combination according to the invention is greater than the calculated activity, i.e., a synergistic effect is present.

TABLE 16 in vivo preventive test on *Alternaria* test (tomatoes)

| Ex. 1 fluopyram ppm | trifloxy-strobin ppm | prothio-conazole ppm | Ratio | Efficacy % | Colby Expected Value % |
|---|---|---|---|---|---|
| 3 | | | | 10 | |
| 1.5 | | | | 8 | |
| 0.75 | | | | 5 | |
| | 3.6 | | | 41 | |
| | 1.8 | | | 31 | |
| | 0.9 | | | 23 | |
| | | 4.2 | | 10 | |
| | | 2.1 | | 0 | |
| | | 1.05 | | 0 | |
| 3 | 3.6 | 4.2 | 1:1.2:1.4 | 74 | 53 |
| 1.5 | 1.8 | 2.1 | 1:1.2:1.4 | 41 | 36 |
| 0.75 | 0.9 | 1.05 | 1:1.2:1.4 | 36 | 27 |

Example G2: In Vivo Preventive Test on *Venturia* Test (Apples)

Solvent: 24.5 parts by weight of acetone
24.5 parts by weight of dimethyl sulfoxide
Emulsifier: 1 part by weight of alkylaryl polyglycol ether To produce a suitable preparation of active compound, 1 part by weight of active compound is mixed with the stated amounts of solvent and emulsifier, and the concentrate is diluted with water to the desired concentration.

To test for preventive activity, young plants are sprayed with the preparation of active compound at the stated rate of application. After the spray coating has dried on, the plants are inoculated with an aqueous conidia suspension of the causal agent of apple scab (*Venturia inaequalis*) and then remain for 1 day in an incubation cabinet at approximately 20° C. and a relative atmospheric humidity of 100%.

The plants are then placed in a greenhouse at approximately 21° C. and a relative atmospheric humidity of approximately 90%.

The test is evaluated 10 days after the inoculation. 0% means an efficacy which corresponds to that of the untreated control, while an efficacy of 100% means that no disease is observed.

The table below clearly shows that the observed activity of the active compound combination according to the invention is greater than the calculated activity, i.e., a synergistic effect is present.

TABLE 17 in vivo preventive test on Venturia test (apples)

| Ex. 1 fluopyram ppm | trifloxy-strobin ppm | prothio-conazole ppm | Ratio | Efficacy % | Colby Expected Value % |
|---|---|---|---|---|---|
| 3 | | | | 5 | |
| 1.5 | | | | 0 | |
| 0.75 | | | | 0 | |
| | 3.6 | | | 89 | |
| | 1.8 | | | 65 | |
| | 0.9 | | | 40 | |
| | | 4.2 | | 41 | |
| | | 2.1 | | 17 | |
| | | 1.05 | | 0 | |
| 3 | 3.6 | 4.2 | 1:1.2:1.4 | 95 | 94 |
| 1.5 | 1.8 | 2.1 | 1:1.2:1.4 | 88 | 71 |
| 0.75 | 0.9 | 1.05 | 1:1.2:1.4 | 40 | 40 |

Example H: Field Trials with Active Combinations Comprising (A) Fluopyram, (B) Prothioconazole and (C) Trifloxystrobin Field trials in lentils were conducted in Western Canada in spring/summer 2018.

Fertilization and herbicide applications were carried out according to the local agricultural practice.

Fluopyram was added to Delaro in a final concentration of 50, 75 and 90 g/ha.

The following products as shown in Table 18 were sprayed using a Backpack hand boom sprayer with air induction flat fan spray nozzles applying 93.5 L/Ha spray solution at crop BBCH—growth stage 62-63.

TABLE 18

| Product Name | Active Ingredients | Concentration [g/L] | Application Rate [g/ha] |
|---|---|---|---|
| DELARO | Prothioconazole + | 175 | 154 |
|  | Trifloxystrobin | 150 | 132 |
| DELARO 0.88 L/Ha ++ Fluopyram | Prothioconazole + | 175 | 154 |
|  | Trifloxystrobin | 150 | 132 |
|  | Fluopyram |  | 50, 75 |
| DELARO 0.572 L/ha + Fluopyram | Prothioconazole + | 175 | 100 |
|  | Trifloxystrobin | 150 | 85.8 |
|  | Fluopyram |  | 90 |
| PRIAXOR + | Fluxapyroxad | 116.4 | 49 |
|  | Pyraclostrobin | 333.3 | 97 |

TABLE 19

| Product Name | Yield [% of Priaxor treatment-Priaxor is 100%] |
|---|---|
| Untreated | 92.2 |
| DELARO | 99.1 |
| Fluopyram (50 g/ha) | 93.8 |
| Fluopyram (75 g/ha) | 96.3 |
| DELARO (0.88 L/Ha) + Fluopyram (50 g/ha) | 102.2 |
| DELARO (0.88 L/Ha) + Fluopyram (75 g/ha) | 104.2 |
| DELARO (0.572 L/Ha) + Fluopyram (90 g/ha) | 101.8 |

Example I: Field Trials with Active Combinations Comprising (A) Fluopyram, (B) Prothioconazole and (C) Trifloxystrobin Field trials in field peas were conducted in Western Canada in spring/summer 2018.

Fertilization and herbicide applications were carried out according to the local agricultural practice.

Fluopyram was added to Delaro in a final concentration of 50, 75 and 90 g/ha.

The following products as shown in Table 20 were sprayed using a Backpack hand boom sprayer with flat fan spray nozzles applying 93.5 L/ha spray solution at crop BBCH growth stage 63.

TABLE 20

| Product Name | Active Ingredients | Concentration [g/L] | Application Rate [g/ha] |
|---|---|---|---|
| DELARO | Prothioconazole + | 175 | 154 |
|  | Trifloxystrobin | 150 | 132 |
| DELARO 0.88 L/ha + Fluopyram | Prothioconazole + | 175 | 154 |
|  | Trifloxystrobin | 150 | 132 |
|  | Fluopyram |  | 50, 75 |
| DELARO 0.572 L/ha + Fluopyram | Prothioconazole + | 175 | 100 |
|  | Trifloxystrobin | 150 | 85.8 |
|  | Fluopyram |  | 90 |
| PRIAXOR | Fluxapyroxad + | 116.4 | 49 |
|  | Pyraclostrobin | 333.3 | 97 |

TABLE 21

| Product Name | Yield [% of Priaxor treatment-Priaxor is 100 %] |
|---|---|
| Untreated | 98.9 |
| DELARO | 103 |
| Fluopyram (50 g/ha) | 98.9 |
| Fluopyram (75 g/ha) | 99.7 |
| DELARO (0.88 L/ha) + Fluopyram (50 g/ha) | 103.6 |
| DELARO (0.88 L/ha) + Fluopyram (75 g/ha) | 106.3 |
| DELARO (0.572 L/ha) + Fluopyram (90 g/ha) | 101.6 |

The invention claimed is:

1. A method for controlling an infestation of one or more phytopathogenic fungi for use in crop protection, comprising applying:
    an active compound combination or a fungicide composition comprising:
    (A) Fluopyram;
    (B) Prothioconazole; and
    (C) one fungicide selected from the group consisting of Trifloxystrobin and Tebuconazole to a plant, plant part, phytopathogenic fungi or a phytopathogenic fungi habitat thereof;
    wherein:
        the active compound combination or the fungicide composition is applied at one or more Biologische Bundesanstalt, Bundessortenamt und CHemische Industrie Scale (BBCH-scale) growth stages 61 to 69.

2. A method according to claim 1, wherein the phytopathogenic fungi are selected from the group consisting of *Cercospora zeae-maydis* or *Cercospora sojina*.

3. A method according to claim 1, wherein the plant is a genetically modified plant.

4. A method according to claim 3, wherein the plant is selected from the group consisting of barley, chickpea, corn, corn grown for seed, cotton, durum, dry peas, field corn, field peas, flax, millet, lentils, oats, soybean, sugar beets, rye, sweet corn, teosinte, triticale, turf grass wheat, and winter wheat.

5. A method according to claim 1, wherein the active compound combination or the fungicide composition is applied at a concentration of 50 to 400 g/ha of total active ingredient.

6. A method according to claim 1, wherein the active compound combination or the fungicide composition is applied at a concentration of 90 to 175 g/ha of Prothioconazole, 80 to 140 g/ha of Trifloxystrobin or Tebuconazole, 50 to 100 g/ha of Fluopyram.

* * * * *